United States Patent
Tseng et al.

(10) Patent No.: US 11,243,378 B2
(45) Date of Patent: Feb. 8, 2022

(54) LENS ASSEMBLY

(71) Applicants: Sintai Optical (Shenzhen) Co., Ltd., ShenZhen (CN); Asia Optical Co., Inc., Taichung (TW)

(72) Inventors: Ming-Huang Tseng, Taichung (TW); Hsi-Ling Chang, Taichung (TW); Chien-Hung Chen, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 342 days.

(21) Appl. No.: 16/407,327

(22) Filed: May 9, 2019

(65) Prior Publication Data
US 2020/0124827 A1    Apr. 23, 2020

(30) Foreign Application Priority Data
Oct. 22, 2018 (CN) .......................... 201811227915.0

(51) Int. Cl.
| | |
|---|---|
| G02B 3/02 | (2006.01) |
| G02B 17/00 | (2006.01) |
| G02B 13/02 | (2006.01) |
| G02B 13/04 | (2006.01) |
| G02B 9/60 | (2006.01) |
| G02B 13/00 | (2006.01) |

(52) U.S. Cl.
CPC ........... *G02B 13/0045* (2013.01); *G02B 9/60* (2013.01)

(58) Field of Classification Search
CPC .......... G02B 13/18; G02B 3/00; G02B 21/02; G02B 13/00; G02B 13/02; G02B 13/04; G02B 9/60

USPC ....... 359/714, 642, 657, 733, 746, 753, 763, 359/764
See application file for complete search history.

(56) References Cited

U.S. PATENT DOCUMENTS

| 8,917,458 B2 | 12/2014 | Tsai et al. | |
|---|---|---|---|
| 2012/0257287 A1* | 10/2012 | Huang | G02B 9/60 |
| | | | 359/714 |
| 2013/0057966 A1* | 3/2013 | Tsai | G02B 9/60 |
| | | | 359/714 |
| 2016/0252708 A1* | 9/2016 | Chung | G02B 13/0045 |
| | | | 359/714 |
| 2018/0210175 A1* | 7/2018 | Jhang | G02B 13/0045 |

FOREIGN PATENT DOCUMENTS

| CN | 108398771 A | 8/2018 |
|---|---|---|
| JP | 2018097289 A | 6/2018 |
| TW | 201629569 A | 8/2016 |

* cited by examiner

*Primary Examiner* — Dawayne Pinkney
(74) *Attorney, Agent, or Firm* — McClure, Qualey & Rodack, LLP

(57) ABSTRACT

A lens assembly includes a first lens, a second lens, a third lens, a fourth lens and a fifth lens are arranged in order from an object side to an image side along an optical axis. The first lens has positive refractive power and includes a convex surface facing the object side and a concave surface facing the image side. The second lens has negative refractive power. The third lens has positive refractive power and includes a convex surface facing the object side. The fourth lens has positive refractive power. The fifth lens has negative refractive power and includes a concave surface facing the image side. The lens assembly satisfies $5<(R_{11}+R_{12})/(R_{21}+R_{22})<15$.

20 Claims, 16 Drawing Sheets

LENS ASSEMBLY

BACKGROUND OF THE INVENTION

Field of the Invention

The invention relates to a lens assembly.

Description of the Related Art

The current development trend of a lens assembly is toward miniaturization. Additionally, the lens assembly is developed to have high resolution capability in accordance with different application requirements. However, the known lens assembly can't satisfy such requirements. Therefore, the lens assembly needs a new structure in order to meet the requirements of miniaturization and high resolution at the same time.

BRIEF SUMMARY OF THE INVENTION

The invention provides a lens assembly to solve the above problems. The lens assembly of the invention is provided with characteristics of a shortened total lens length, a higher resolution, and still has a good optical performance.

The lens assembly in accordance with an exemplary embodiment of the invention includes a first lens, a second lens, a third lens, a fourth lens and a fifth lens, wherein the first lens, the second lens, the third lens, the fourth lens and the fifth lens are arranged in order from an object side to an image side along an optical axis. The first lens has positive refractive power and includes a convex surface facing the object side and a concave surface facing the image side. The second lens has negative refractive power. The third lens has positive refractive power and includes a convex surface facing the object side. The fourth lens has positive refractive power. The fifth lens has negative refractive power and includes a concave surface facing the image side. The lens assembly satisfies $5<(R_{11}+R_{12})/(R_{21}+R_{22})<15$, wherein $R_{11}$ is a radius of curvature of the convex surface of the first lens, $R_{12}$ is a radius of curvature of the concave surface of the first lens, $R_{21}$ is a radius of curvature of the object surface of the second lens, and $R_{22}$ is a radius of curvature of the image side surface of the second lens.

In accordance with the invention, the lens assembly satisfies: $-2<f/f_5<0$, $-2.5<f_5/f_1<0$, wherein f is an effective focal length of the lens assembly, $f_1$ is an effective focal length of the first lens, and $f_5$ is an effective focal length of the fifth lens.

In accordance with the invention, the lens assembly satisfies: $0.4<BFL/TTL<0.55$, wherein BFL is an interval from the concave surface of the fifth lens to an image plane along the optical axis and TTL is an interval from the convex surface of the first lens to the image plane along the optical axis.

In accordance with the invention, the lens assembly satisfies: $10\ mm<f_3+f_4<15\ mm$, wherein $f_3$ is an effective focal length of the third lens and $f_4$ is an effective focal length of the fourth lens.

In accordance with the invention, the lens assembly satisfies: $0<R_{41}/R_{11}<2$, wherein $R_{11}$ is a radius of curvature of the convex surface of the first lens and $R_{41}$ is a radius of curvature of the object side surface of the fourth lens.

In accordance with the invention, the lens assembly satisfies: $-5<f/f_2<-3$, wherein f is an effective focal length of the lens assembly and $f_2$ is an effective focal length of the second lens.

In accordance with the invention, the lens assembly satisfies: $10\ mm<f_{45}<15\ mm$, wherein $f_{45}$ is an effective focal length of a combination of the fourth lens and the fifth lens.

In accordance with the invention, the first lens is a meniscus lens, the second lens is a biconcave lens which includes a concave surface facing the object side and another concave surface facing the image side, and the fourth lens is a biconvex lens which includes a convex surface facing the object side and another convex surface facing the image side.

In accordance with the invention, the lens assembly satisfies: $-5<(R_{31}+R_{32})/(R_{41}+R_{42})<2$, wherein $R_{31}$ is a radius of curvature of the convex surface of the third lens, $R_{32}$ is a radius of curvature of the image side surface of the third lens, $R_{41}$ is a radius of curvature of the convex surface of the fourth lens, and $R_{42}$ is a radius of curvature of the another convex surface of the fourth lens.

In accordance with the invention, the fifth lens is a biconcave lens and further includes a concave surface facing the object side.

The lens assembly in accordance with another exemplary embodiment of the invention includes a first lens, a second lens, a third lens, a fourth lens and a fifth lens, wherein the first lens, the second lens, the third lens, the fourth lens and the fifth lens are arranged in order from an object side to an image side along an optical axis. The first lens has positive refractive power and including a convex surface facing the object side. The second lens has negative refractive power. The third lens has positive refractive power and including a convex surface facing the object side. The fourth lens has positive refractive power. The fifth lens has negative refractive power. The lens assembly satisfies $-1<R_{21}/R_{22}<-0.5$, wherein $R_{21}$ is a radius of curvature of the object side surface of the second lens and $R_{22}$ is a radius of curvature of the image side surface of the second lens.

In accordance with the invention, the lens assembly satisfies: $-2<f/f_5<0$, $10\ mm<f_3+f_4<15\ mm$, wherein f is an effective focal length of the lens assembly, $f_3$ is an effective focal length of the third lens, $f_4$ is an effective focal length of the fourth lens and $f_5$ is an effective focal length of the fifth lens.

In accordance with the invention, the lens assembly satisfies: $-2.5<f_5/f_1<0$, wherein $f_1$ is an effective focal length of the first lens and $f_5$ is an effective focal length of the fifth lens.

In accordance with the invention, the lens assembly satisfies: $0.4<BFL/TTL<0.55$, wherein BFL is an interval from the concave surface of the fifth lens to an image plane along the optical axis and TTL is an interval from the convex surface of the first lens to the image plane along the optical axis.

In accordance with the invention, the lens assembly satisfies: $5<(R_{11}+R_{12})/(R_{21}+R_{22})<15$, wherein $R_{11}$ is a radius of curvature of the convex surface of the first lens, $R_{12}$ is a radius of curvature of the image side surface of the first lens, $R_{21}$ is a radius of curvature of the object surface of the second lens, and $R_{22}$ is a radius of curvature of the image side surface of the second lens.

In accordance with the invention, the lens assembly satisfies: $0<R_{41}/R_{11}<2$, wherein $R_{11}$ is a radius of curvature of the convex surface of the first lens and $R_{41}$ is a radius of curvature of the object side surface of the fourth lens.

In accordance with the invention, the lens assembly satisfies: $-5<f/f_2<-3$, wherein f is an effective focal length of the lens assembly and $f_2$ is an effective focal length of the second lens.

In accordance with the invention, the lens assembly satisfies: 10 mm<$f_{45}$<15 mm, wherein $f_{45}$ is an effective focal length of a combination of the fourth lens and the fifth lens.

In accordance with the invention, the first lens is a meniscus lens and further includes a concave surface facing the image side, the second lens is a biconcave lens and includes a concave surface facing the object side and another concave surface facing the image side, and the fourth lens is a biconvex lens and includes a convex surface facing the object side and another convex surface facing the image side.

In accordance with the invention, the lens assembly satisfies: −5<($R_{31}$+$R_{32}$)/($R_{41}$+$R_{42}$)<2, wherein $R_{31}$ is a radius of curvature of the convex surface of the third lens, $R_{32}$ is a radius of curvature of the image side surface of the third lens, $R_{41}$ is a radius of curvature of the convex surface of the fourth lens, and $R_{42}$ is a radius of curvature of the another convex surface of the fourth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
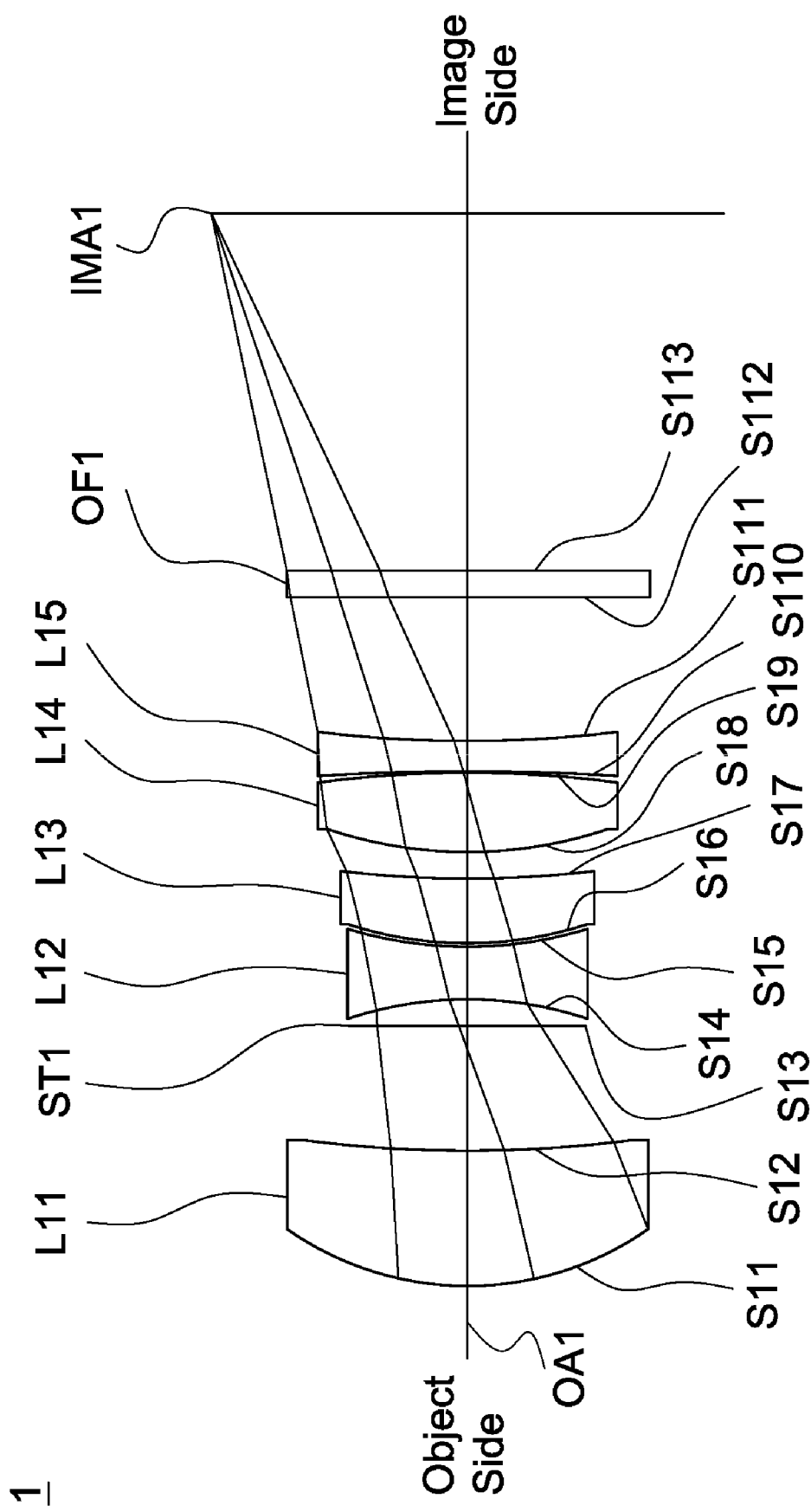
FIG. 1 is a lens layout and optical path diagram of a lens assembly in accordance with a first embodiment of the invention.

The following description is made for the purpose of illustrating the general principles of the invention and should not be taken in a limiting sense. The scope of the invention is best determined by reference to the appended claims.

The invention provides a lens assembly includes a first lens, a second lens, a third lens, a fourth lens, and a fifth lens, wherein the first lens, the second lens, the third lens, the fourth lens and the fifth lens are arranged in order from an object side to an image side along an optical axis. The first lens has positive refractive power and including a convex surface facing the object side. The second lens has negative refractive power. The third lens has positive refractive power and including a convex surface facing the object side. The fourth lens has positive refractive power. The fifth lens has negative refractive power and including a concave surface facing the image side. The lens assembly satisfies: 10 mm<$f_3$+$f_4$<15 mm, wherein $f_3$ is an effective focal length of the third lens and $f_4$ is an effective focal length of the fourth lens.

The invention provides another lens assembly includes a first lens, a second lens, a third lens, a fourth lens, and a fifth lens, wherein the first lens, the second lens, the third lens, the fourth lens and the fifth lens are arranged in order from an object side to an image side along an optical axis. The first lens has positive refractive power and including a convex surface facing the object side. The second lens has negative refractive power. The third lens has positive refractive power and including a convex surface facing the object side. The fourth lens has positive refractive power. The fifth lens has negative refractive power and including a concave surface facing the image side. The lens assembly satisfies: 5<($R_{11}$+$R_{12}$)/($R_{21}$+$R_{22}$)<15, wherein $R_{11}$ is a radius of curvature of the object side surface of the first lens, $R_{12}$ is a radius of curvature of the image side surface of the first lens, $R_{21}$ is a radius of curvature of the object side surface of the second lens, and $R_{22}$ is a radius of curvature of the image side surface of the second lens.

Please referring to the below Table 1, Table 2, Table 4, Table 5, Table 7, Table 8, Table 10 and Table 11, wherein Table 1, Table 4, Table 7, and Table 10 are the lens assembly in accordance with the first, the second, the third and fourth embodiment of the invention is provided with the optical specifications respectively, the conic constant k and the aspheric coefficients of each surface of the first, the second, the third and the fourth embodiment are shown in Table 2, Table 5, Table 8 and Table 11.

Referring to FIG. 1, FIG. 3, FIG. 5 and FIG. 7 are a lens layout and optical path diagram of a lens assembly in accordance with a first, a second, a third and a fourth embodiment of the invention. The first lens L11, L21, L31, L41 has positive refractive power and made of plastic material, wherein the object side surface S11, S21, S31, S41 is a convex surface, and both of the object side surface S11, S21, S31, S41 and image side surface S12, S22, S32, S42 are aspheric surfaces.

The second lens L12, L22, L32, L42 has negative refractive power and made of glass material, wherein both of the object side surface S14, S24, S34, S44 and image side surface S15, S25, S35, S45 are aspheric surfaces.

The third lens L13, L23, L33, L43 has positive refractive power and made of glass material, wherein the object side surface S16, S26, S36, S46 is a convex surface, and both of the object side surface S16, S26, S36, S46 and image side surface S17, S27, S37, S47 are aspheric surfaces.

The fourth lens L14, L24, L34, L44 has positive refractive power and made of glass material, wherein both of the object side surface S18, S28, S38, S48 and image side surface S19, S29, S39, S49 are aspheric surfaces.

The fifth lens L15, L25, L35, L45 has negative refractive power and made of glass material, wherein the image side surface S111, S211, S311, S411 is a concave surface, and both of the object side surface S110, S210, S310, S410 and image side surface S111, S211, S311, S411 are aspheric surfaces.

In addition, the lens assembly 1, 2, 3, 4 of the first, the second, the third and the fourth embodiment at least satisfies one of the following conditions:

$$10 \text{ mm} \leq f_3 + f_4 < 15 \text{ mm} \quad (1)$$

$$5 < (R_{11} + R_{12})/(R_{21} + R_{22}) < 15 \quad (2)$$

$$-2 < f/f_5 < 0 \quad (3)$$

$$-2.5 < f_5/f_1 < 0 \quad (4)$$

$$0.4 < BFL/TTL < 0.55 \quad (5)$$

$$-1 < R_{21}/R_{22} < -0.5 \quad (6)$$

$$0 < R_{41}/R_{11} < 2 \quad (7)$$

$$-5 < f/f_2 < -3 \quad (8)$$

$$5 < (R_{31} + R_{22})/(R_{41} + R_{42}) < 2 \quad (9)$$

$$10 \text{ mm} \leq f_{45} < 15 \text{ mm} \quad (10)$$

wherein f is an effective focal length of the lens assembly 1, 2, 3, 4 of the first, the second, the third and the fourth embodiment, $f_1$ is an effective focal length of the first lens L11, L21, L31, L41 of the first, the second, the third and the fourth embodiment, $f_2$ is an effective focal length of the second lens L12, L22, L32, L42 of the first, the second, the third and the fourth embodiment, $f_3$ is an effective focal length of the third lens L13, L23, L33, L43 of the first, the second, the third and the fourth embodiment, $f_4$ is an effective focal length of the fourth lens L14, L24, L34, L44 of the first, the second, the third and the fourth embodiment, $f_5$ is an effective focal length of the fifth lens L15, L25, L35, L45 of the first, the second, the third and the fourth embodiment, $f_{45}$ is an effective focal length of a combination of the fourth lens L14, L24, L34, L44 and the fifth lens L15, L25, L35, L45 of the first, the second, the third and the fourth embodiment, $R_{11}$ is a radius of curvature of the object side surface S11, S21, S31, S41 of the first lens L11, L21, L31, L41 of the first, the second, the third and the fourth embodiment, $R_{12}$ is a radius of curvature of the image side surface S12, S22, S32, S42 of the first lens L11, L21, L31, L41 of the first, the second, the third and the fourth embodiment, $R_{21}$ is a radius of curvature of the object side surface S14, S24, S34, S44 of the second lens L12, L22, L32, L42 of the first, the second, the third and the fourth embodiment, $R_{22}$ is a radius of curvature of the image side surface S15, S25, S35, S45 of the second lens L12, L22, L32, L42 of the first, the second, the third and the fourth embodiment, $R_{31}$ is a radius of curvature of the object side surface S16, S26, S36, S46 of the third lens L13, L23, L33, L43 of the first, the second, the third and the fourth embodiment, $R_{32}$ is a radius of curvature of the image side surface S17, S27, S37, S47 of the third lens L13, L23, L33, L43 of the first, the second, the third and the fourth embodiment, $R_{41}$ is a radius of curvature of the object side surface S18, S28, S38, S48 of the fourth lens L14, L24, L34, L44 of the first, the second, the third and the fourth embodiment, $R_{42}$ is a radius of curvature of the image side surface S19, S29, S39, S49 of the fourth lens L14, L24, L34, L44 of the first, the second, the third and the fourth embodiment, TTL is an interval from the object surface S11, S21, S31, S41 of the first lens L11, L21, L31, L41 to the image plane IMA1, IMA2, IMA3, IMA4 along the optical axis OA1, OA2, OA3, OA4 of the first, the second, the third and the fourth embodiment, BFL is an interval from the image surface S111, S211, S311, S411 of the fifth lens L15, L25, L35, L45 to the image plane IMA1, IMA2, IMA3, IMA4 along the optical axis OA1, OA2, OA3, OA4 of the first, the second, the third and the fourth embodiment. The lens assembly 1, 2, 3, 4 is provided with an effective shortened total lens length, an increased resolution, and an effective corrected aberration.

Referring to FIG. 1, FIG. 1 is a lens layout and optical path diagram of a lens assembly in accordance with a first embodiment of the invention. The lens assembly 1 includes a first lens L11, a stop ST1, a second lens L12, a third lens L13, a fourth lens L14, a fifth lens L15 and an optical filter OF1, all of which are arranged in order from an object side to an image side along an optical axis OA1. In operation, an image of light rays from the object side is formed at the image plane IMA1. According to the second paragraphs to the ninth paragraphs of the DETAILED DESCRIPTION OF THE INVENTION, wherein:

The first lens L11 is further a meniscus lens and the image side surface S12 is a concave surface. The second lens L12 is further a biconcave lens, wherein the object side surface S14 is a concave surface, the image side surface S15 is a concave surface. The third lens L13 is further a meniscus lens and the image side surface S17 is a concave surface. The fourth lens L14 is further a biconvex lens, wherein the object side surface S18 is a convex surface, the image side surface S19 is a convex surface. The fifth lens L15 is further a biconcave lens and the object side surface S110 is a concave surface.

Both of the object side surface S112 and image side surface S113 of the optical filter OF1 are plane surfaces.

By the above design of the lenses and stop ST1, and satisfies at least one of the conditions (1)-(10), the lens assembly 1 is provided with an effective shortened total lens length, an increased resolution, and an effective corrected aberration.

In order to achieve the above purposes and effectively enhance the optical performance, the lens assembly 1 in accordance with the first embodiment of the invention is provided with the optical specifications shown in Table 1, which include the effective focal length, F-number, total lens length, field of view, radius of curvature of each lens surface, thickness between adjacent surface, refractive index of each lens and Abbe number of each lens. Table 1 shows that the effective focal length is equal to 12.000 mm, F-number is equal to 2.89, total lens length is equal to 12.029 mm, and field of view is equal to 27.3 degrees for the lens assembly 1 of the first embodiment of the invention.

TABLE 1

Effective Focal Length = 12.000 mm
F-number = 2.89
Total Lens Length = 12.029 mm
Field of View = 27.3 degrees

| Surface Number | Radius of Curvature (mm) | Thickness (mm) | Nd | Vd | Remark |
|---|---|---|---|---|---|
| S11 | 3.619771 | 1.515 | 1.6855 | 54.62 | The First Lens L11 |
| S12 | 11.69783 | 1.394939 | | | |
| S13 | ∞ | 0.2941134 | | | Stop ST1 |
| S14 | −3.37623 | 0.594 | 1.6606 | 20.401 | The Second Lens L12 |
| S15 | 4.437873 | 0.031 | | | |
| S16 | 3.76404 | 0.736 | 1.5352 | 56.115 | The Third Lens L13 |
| S17 | 31.74468 | 0.2892055 | | | |
| S18 | 4.022028 | 0.9 | 1.6606 | 20.401 | The Fourth Lens L14 |
| S19 | −12.6784 | 0.017 | | | |
| S110 | −26.4462 | 0.316 | 1.5352 | 56.115 | The Fifth Lens L15 |
| S111 | 6.748697 | 1.626 | | | |
| S112 | ∞ | 0.3 | 1.5168 | 64.167 | Optical Filter OF1 |
| S113 | ∞ | 4.015623 | | | |

The aspheric surface sag z of each lens in Table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F and G of each surface are shown in Table 2.

TABLE 2

| Surface Number | k | A | B | C | D |
|---|---|---|---|---|---|
| | | E | F | G | |
| S11 | 0.101268 | −0.00054649602 | −5.4619348e−005 | −2.7316792e−005 | 3.0846177e−006 |
| | | −2.6167937e−007 | −2.3560203e−007 | 2.6331808e−008 | |
| S12 | 0 | −0.00090319669 | −0.00021044113 | −1.2015838e−005 | −1.0474135e−005 |
| | | 1.5391578e−006 | −4.5157762e−007 | 8.6096361e−008 | |
| S14 | 0 | 0.021350407 | −0.0015130083 | −0.00052253946 | 0.00034198929 |
| | | −1.107855e−005 | −9.345071e−006 | 7.2281708e−007 | |
| S15 | −0.595168 | −0.0033010828 | −0.0048459156 | 0.00050893267 | 0.00041023799 |
| | | 0.00054160556 | 0.00014977729 | −0.00010362681 | |
| S16 | −1.752286 | −0.005595698 | −0.0084868692 | 0.00058394714 | 0.0010680443 |
| | | 0.00061231107 | 2.9101656e−005 | −0.00010988383 | |
| S17 | −111.241 | −0.0035853486 | 0.0059275615 | 0.0016971933 | −0.00066706849 |
| | | 0.00010060447 | 4.3748766e−005 | −5.3754604e−005 | |
| S18 | −9.283795 | −0.010511076 | 0.0035001976 | 0.0011923196 | 9.2148585e−005 |
| | | −0.0001141603 | −3.5063669e−005 | 4.466899e−006 | |
| S19 | −106.4059 | −0.010105411 | 0.0026283951 | 0.00068080641 | 0.00016388749 |
| | | −7.2536162e−005 | −5.1526797e−006 | −3.7681292e−006 | |
| S110 | −154.9735 | −0.012788558 | 0.0026250682 | 0.00049779532 | −0.00018002677 |
| | | 8.0809192e−005 | 1.3135838e−005 | −8.4449004e−006 | |
| S111 | −22.1734 | −0.011391347 | 0.0011000343 | −0.00063003799 | 0.00034586609 |
| | | 4.9205849e−006 | −2.0210221e−005 | 3.009471e−006 | |

Table 3 shows the parameters and condition values for conditions (1)-(10). As can be seen from Table 3, the lens assembly 1 of the first embodiment satisfies the conditions (1)-(10).

TABLE 3

| f | 12.000 mm | $f_1$ | 7.105 mm | $f_2$ | −2.818 mm |
|---|---|---|---|---|---|
| $f_3$ | 7.906 mm | $f_4$ | 4.724 mm | $f_5$ | −10.012 mm |
| $f_{45}$ | 13.436 mm | $R_{11}$ | 3.620 mm | $R_{12}$ | 11.698 mm |
| $R_{21}$ | −3.376 mm | $R_{22}$ | 4.438 mm | $R_{31}$ | 3.764 mm |
| $R_{32}$ | 31.745 mm | $R_{41}$ | 4.022 mm | $R_{42}$ | −12.678 mm |
| TTL | 12.029 mm | BFL | 5.942 mm | | |
| $(R_{11} + R_{12})/(R_{21} + R_{22})$ | 14.428 | $f_3 + f_4$ | 12.630 mm | $f/f_5$ | −1.199 |
| $(R_{31} + R_{32})/(R_{41} + R_{42})$ | −4.102 | $f_5/f_1$ | −1.409 | BFL/TTL | 0.494 |
| $R_{21}/R_{22}$ | −0.761 | $R_{41}/R_{11}$ | 1.111 | $f/f_2$ | −4.259 |

Figure 2A:
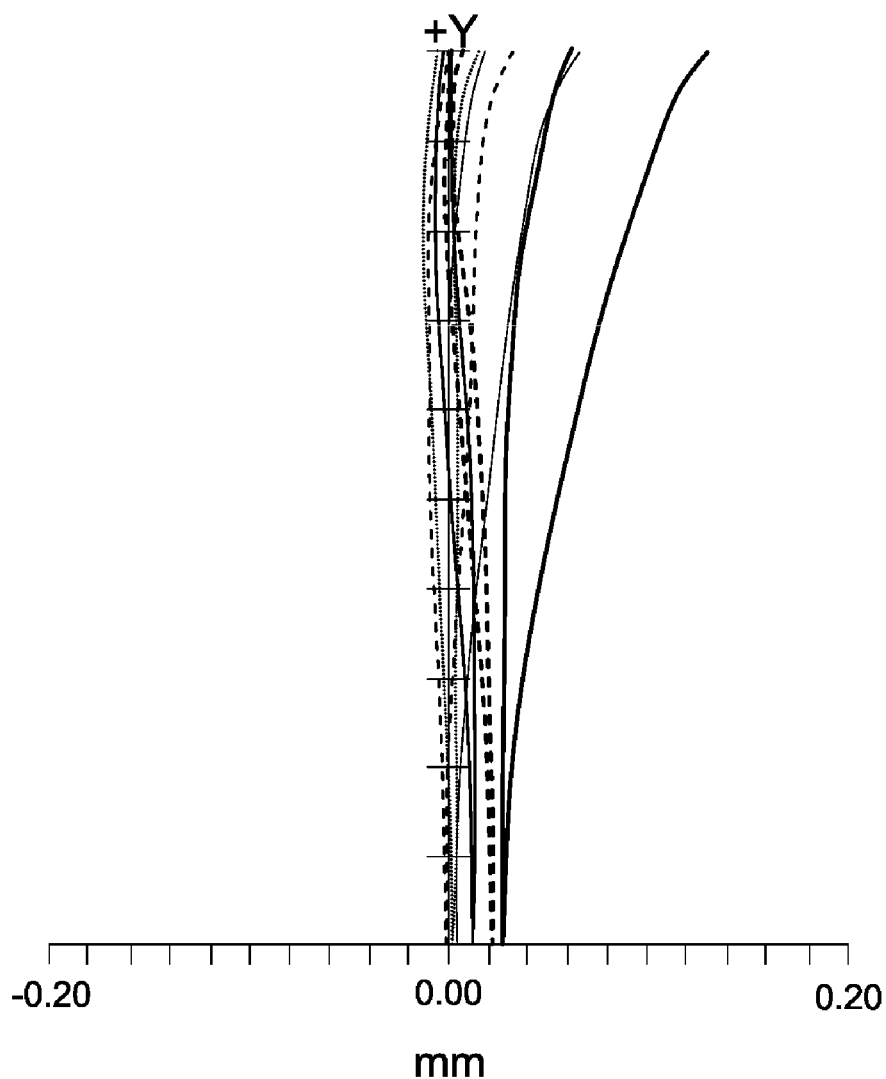
FIG. 2A depicts a field curvature diagram of the lens assembly in accordance with the first embodiment of the invention.
Figure 2B:
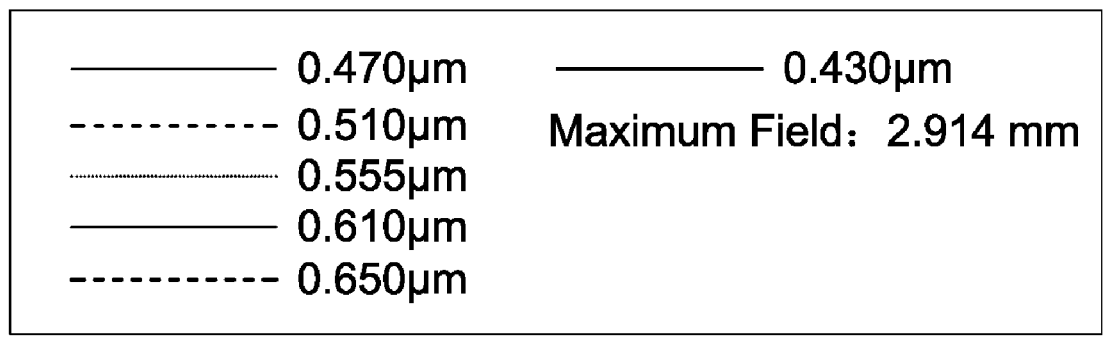
FIG. 2B is a distortion diagram of the lens assembly in accordance with the first embodiment of the invention.
Figure 2B:
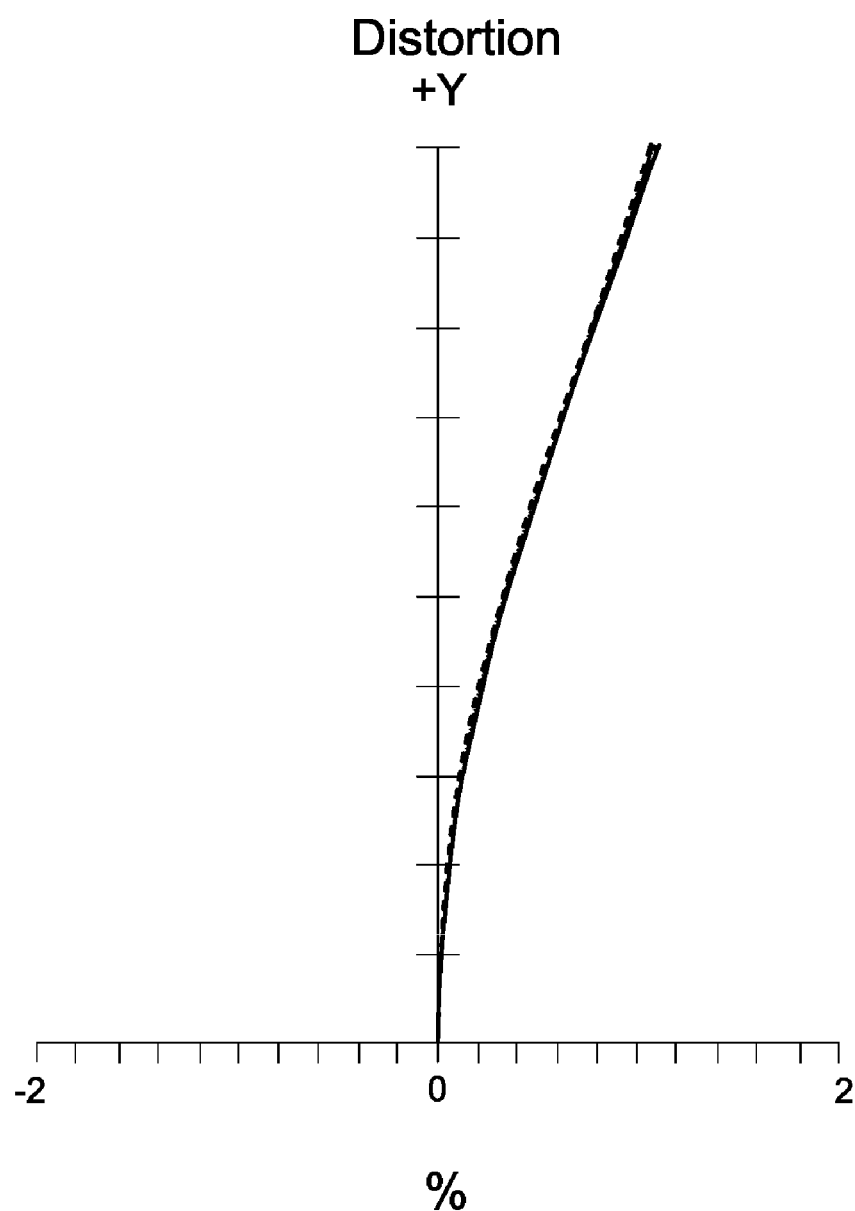
Figure 2C:
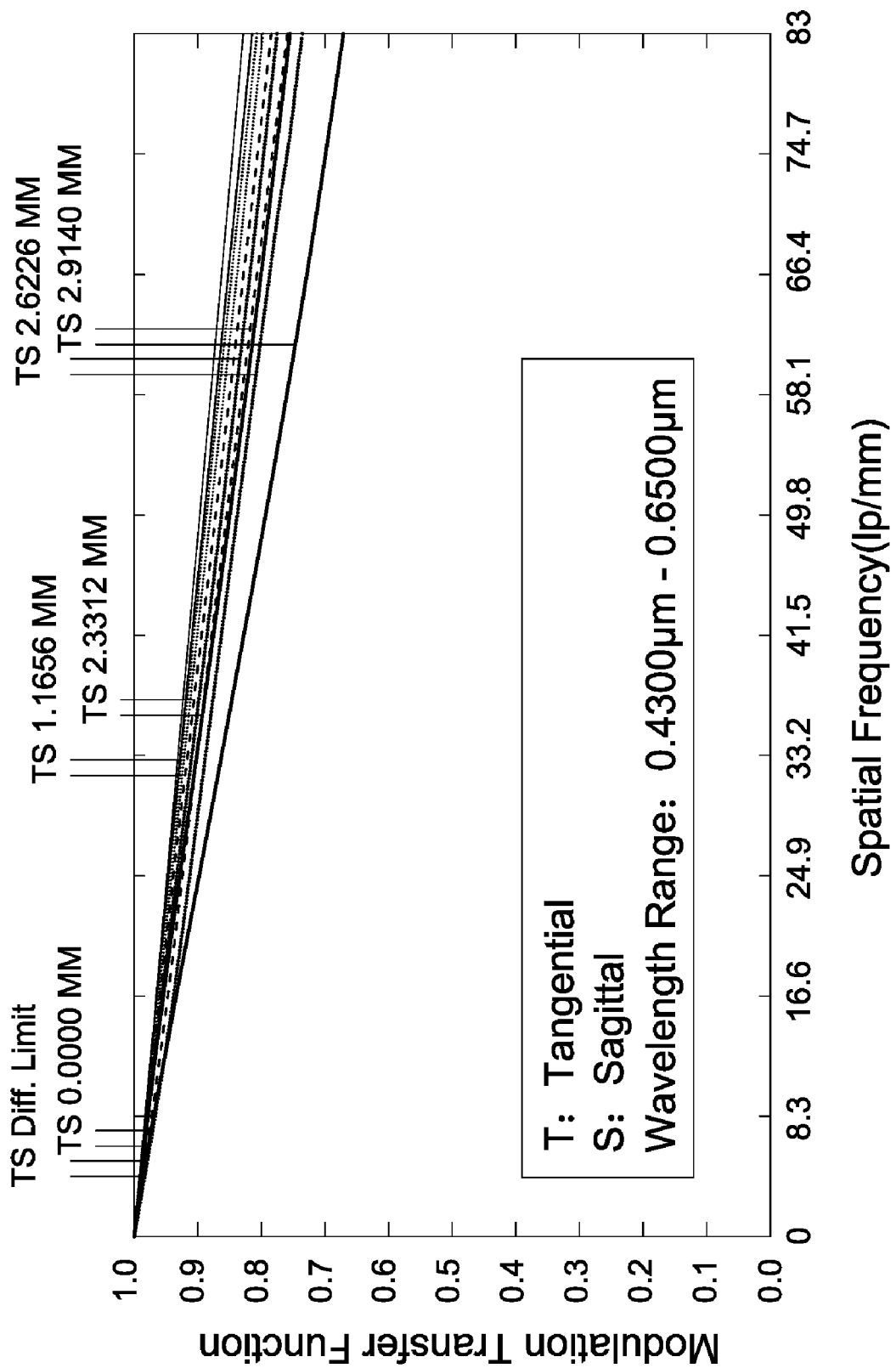
FIG. 2C is a modulation transfer function diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a field curvature diagram of the lens assembly 1 in accordance with the first embodiment of the invention, FIG. 2B shows a distortion diagram of the lens assembly 1 in accordance with the first embodiment of the invention, and FIG. 2C shows a modulation transfer function diagram of the lens assembly 1 in accordance with the first embodiment of the invention.

It can be seen from FIG. 2A that the field curvature of tangential direction and sagittal direction in the lens assembly 1 of the first embodiment ranges from −0.02 mm to 0.14 mm for the wavelength of 0.430 μm, 0.470 μm, 0.510 μm, 0.555 μm, 0.610 μm, and 0.650 μm.

It can be seen from FIG. 2B (in which the six lines in the figure almost coincide to appear as if a signal line) that the distortion in the lens assembly 1 of the first embodiment ranges from 0% to 1.2% for the wavelength of 0.430 μm, 0.470 μm, 0.510 μm, 0.555 μm, 0.610 μm, and 0.650 μm.

It can be seen from FIG. 2C that the modulation transfer function of tangential direction and sagittal direction in the lens assembly 1 of the first embodiment ranges from 0.67 to 1.0 wherein the wavelength ranges from 0.4300 μm to 0.6500 μm, the fields respectively are 0.0000 mm, 1.1656 mm, 2.3312 mm, 2.6226 mm, and 2.9140 mm, and the spatial frequency ranges from 0 lp/mm to 83 lp/mm.

It is obvious that the field curvature and the distortion of the lens assembly 1 of the first embodiment can be corrected effectively, and the resolution of the lens assembly 1 of the first embodiment can meet the requirement. Therefore, the lens assembly 1 of the first embodiment is capable of good optical performance.

Figure 3:
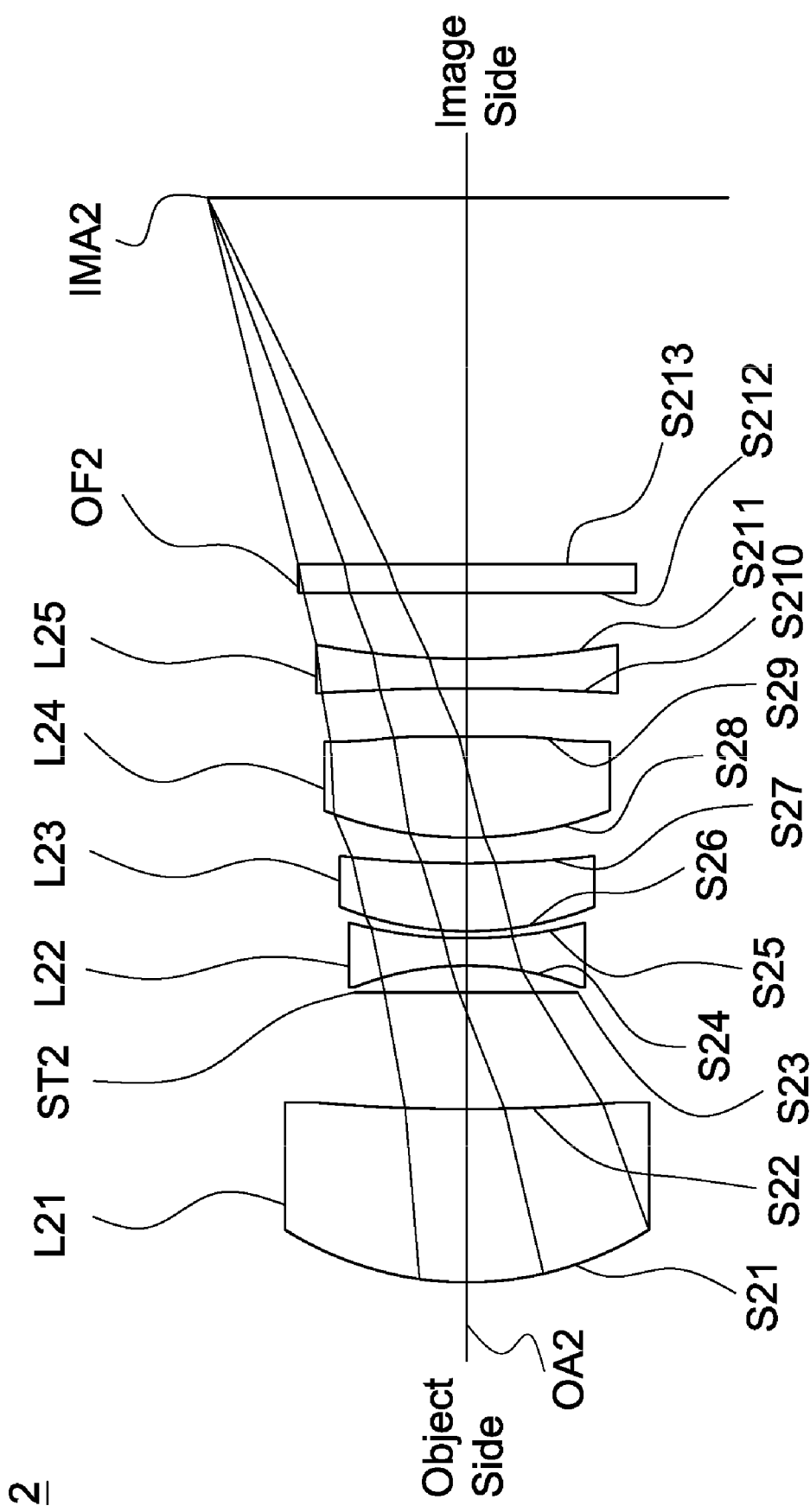
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a first lens L21, a stop ST2, a second lens L22, a third lens L23, a fourth lens L24, a fifth lens L25 and an optical filter OF2, all of which are arranged in order from an object side to an image side along an optical axis OA2. In operation, an image of light rays from the object side is formed at the image plane IMA2. According to the second paragraphs to the ninth paragraphs of the DETAILED DESCRIPTION OF THE INVENTION, wherein:

The first lens L21 is further a meniscus lens and the image side surface S22 is a concave surface. The second lens L22 is further a biconcave lens, wherein the object side surface S24 is a concave surface, the image side surface S25 is a concave surface. The third lens L23 is further a meniscus lens and the image side surface S27 is a concave surface. The fourth lens L24 is further a biconvex lens, wherein the object side surface S28 is a convex surface, the image side surface S29 is a convex surface. The fifth lens L25 is further a biconcave lens and the object side surface S210 is a concave surface.

Both of the object side surface S212 and image side surface S213 of the optical filter OF2 are plane surfaces.

By the above design of the lenses and stop ST2, and satisfies at least one of the conditions (1)-(10), the lens assembly 2 is provided with an effective shortened total lens length, an increased resolution, and an effective corrected aberration.

In order to achieve the above purposes and effectively enhance the optical performance, the lens assembly 2 in accordance with the second embodiment of the invention is provided with the optical specifications shown in Table 4, which include the effective focal length, F-number, total lens length, field of view, radius of curvature of each lens surface, thickness between adjacent surface, refractive index of each lens and Abbe number of each lens. Table 4 shows that the effective focal length is equal to 11.662 mm, F-number is equal to 2.89, total lens length is equal to 11.901 mm, and field of view is equal to 28 degrees for the lens assembly 2 of the second embodiment of the invention.

TABLE 4

Effective Focal Length = 11.662 mm
F-number = 2.89
Total Lens Length = 11.901 mm
Field of View = 28 degrees

| Surface Number | Radius of Curvature (mm) | Thickness (mm) | Nd | Vd | Remark |
|---|---|---|---|---|---|
| S21 | 3.795563 | 1.894214 | 1.6855 | 54.62 | The First Lens L21 |
| S22 | 11.10133 | 1.306691 | | | |
| S23 | ∞ | 0.2941134 | | | Stop ST2 |
| S24 | −2.96902 | 0.3082121 | 1.6606 | 20.401 | The Second Lens L22 |
| S25 | 5.077025 | 0.0618987 | | | |
| S26 | 3.483001 | 0.736 | 1.5352 | 56.115 | The Third Lens L23 |
| S27 | 31.74468 | 0.2892055 | | | |
| S28 | 4.129894 | 1.115346 | 1.6606 | 20.401 | The Fourth Lens L24 |
| S29 | −11.4799 | 0.5321955 | | | |
| S210 | −26.4462 | 0.316 | 1.5352 | 56.115 | The Fifth Lens L25 |
| S211 | 6.738203 | 0.7317082 | | | |
| S212 | ∞ | 0.3 | 1.5168 | 64.167 | Optical Filter OF2 |
| S213 | ∞ | 4.015623 | | | |

The definition of the aspheric surface sag z of each lens in Table 4 is the same as the definition of the aspheric surface sag z of each lens in Table 1 in the first embodiment, and is not described here again.

In the second embodiment, the conic constant k and the aspheric coefficients A, B, C, D, E, F and G of each surface are shown in Table 5.

TABLE 5

| Surface Number | k | A E | B F | C G | D |
|---|---|---|---|---|---|
| S21 | 0.087906 | −0.00059329228 | −8.3763211e−005 | −2.1835937e−005 | 3.478742e−006 |
| | | −3.7156812e−007 | −3.0979845e−007 | 3.5924339e−008 | |
| S22 | 0 | −0.0019687611 | −0.00023887534 | −0.00014231378 | −1.2082288e−005 |
| | | 9.6204608e−006 | 1.1587654e−006 | −8.1920474e−007 | |
| S24 | 0 | 0.022214914 | −0.00271363 | −0.0012769314 | 0.00028232477 |
| | | 0.0002135183 | 9.1971361e−005 | −9.0388068e−005 | |
| S25 | 0.399185 | −0.0019076063 | −0.0049142868 | 0.00054248174 | 0.00068850465 |
| | | 0.00050830217 | 2.4110181e−005 | −0.00018657349 | |
| S26 | −1.167994 | −0.0041356655 | −0.0044304788 | 0.0017735699 | 0.00073899759 |
| | | 0.00039513268 | −2.5025993e−005 | −0.00014042323 | |
| S27 | −111.241 | −0.00068603438 | 0.005026676 | 0.00093753249 | −0.00049497333 |
| | | 0.0003101938 | 7.4925177e−005 | −7.8015638e−005 | |
| S28 | −6.467702 | −0.0088230531 | 0.0032394191 | 0.0009125238 | 6.6981164e−005 |
| | | −8.1826304e−005 | −1.0586852e−005 | 5.3126829e−006 | |
| S29 | −106.4059 | −0.007890729 | 0.0014426247 | 0.00074661411 | 0.00019975256 |
| | | −4.1359505e−005 | 5.9448443e−006 | 8.7373069e−007 | |
| S210 | −154.9735 | −0.017036689 | 0.0028088999 | 0.00054248525 | −8.1740977e−005 |
| | | 8.1858051e−005 | 6.025003e−006 | −5.9650387e−006 | |
| S211 | −22.57639 | −0.010189887 | 0.0027762644 | −0.00071152055 | 0.00019636991 |
| | | 1.9666143e−005 | −4.7750773e−006 | −9.5326099e−007 | |

Table 6 shows the parameters and condition values for conditions (1)-(10). As can be seen from Table 6, the lens assembly 2 of the second embodiment satisfies the conditions (1)-(10).

TABLE 6

| f | 11.662 mm | $f_1$ | 7.611 mm | $f_2$ | −2.793 mm |
|---|---|---|---|---|---|
| $f_3$ | 7.244 mm | $f_4$ | 4.732 mm | $f_5$ | −10.000 mm |
| $f_{45}$ | 11.595 mm | $R_{11}$ | 3.796 mm | $R_{12}$ | 11.101 mm |
| $R_{21}$ | −2.969 mm | $R_{22}$ | 5.077 mm | $R_{31}$ | 3.483 mm |
| $R_{32}$ | 31.745 mm | $R_{41}$ | 4.130 mm | $R_{42}$ | −11.480 mm |
| TTL | 11.901 mm | BFL | 5.047 mm | | |
| $(R_{11}+R_{12})/(R_{21}+R_{22})$ | 7.067 | $f_3+f_4$ | 11.976 mm | $f/f_5$ | −1.166 |
| $(R_{31}+R_{32})/(R_{41}+R_{42})$ | −4.793 | $f_5/f_1$ | −1.314 | BFL/TTL | 0.424 |
| $R_{21}/R_{22}$ | −0.585 | $R_{41}/R_{11}$ | 1.088 | $f/f_2$ | −4.175 |

Figure 4A:
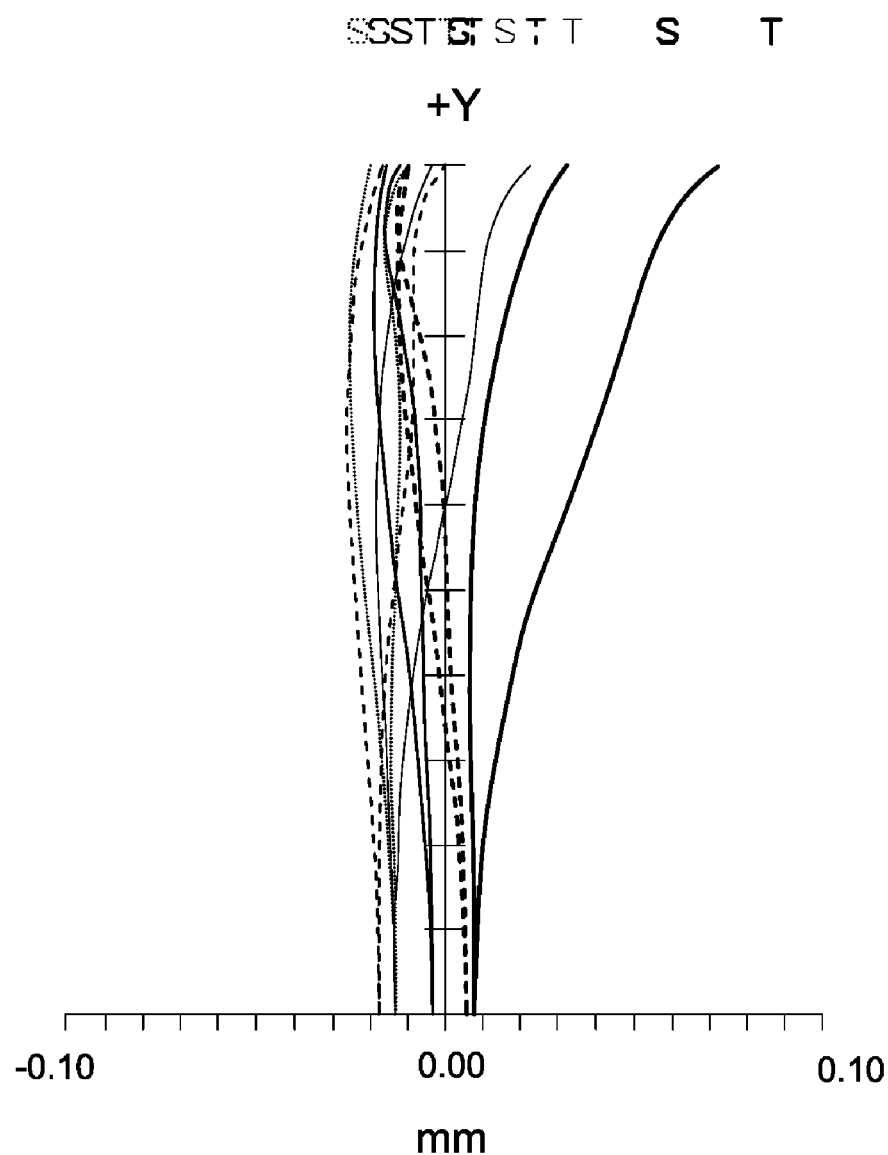
FIG. 4A depicts a field curvature diagram of the lens assembly in accordance with the second embodiment of the invention.
Figure 4B:
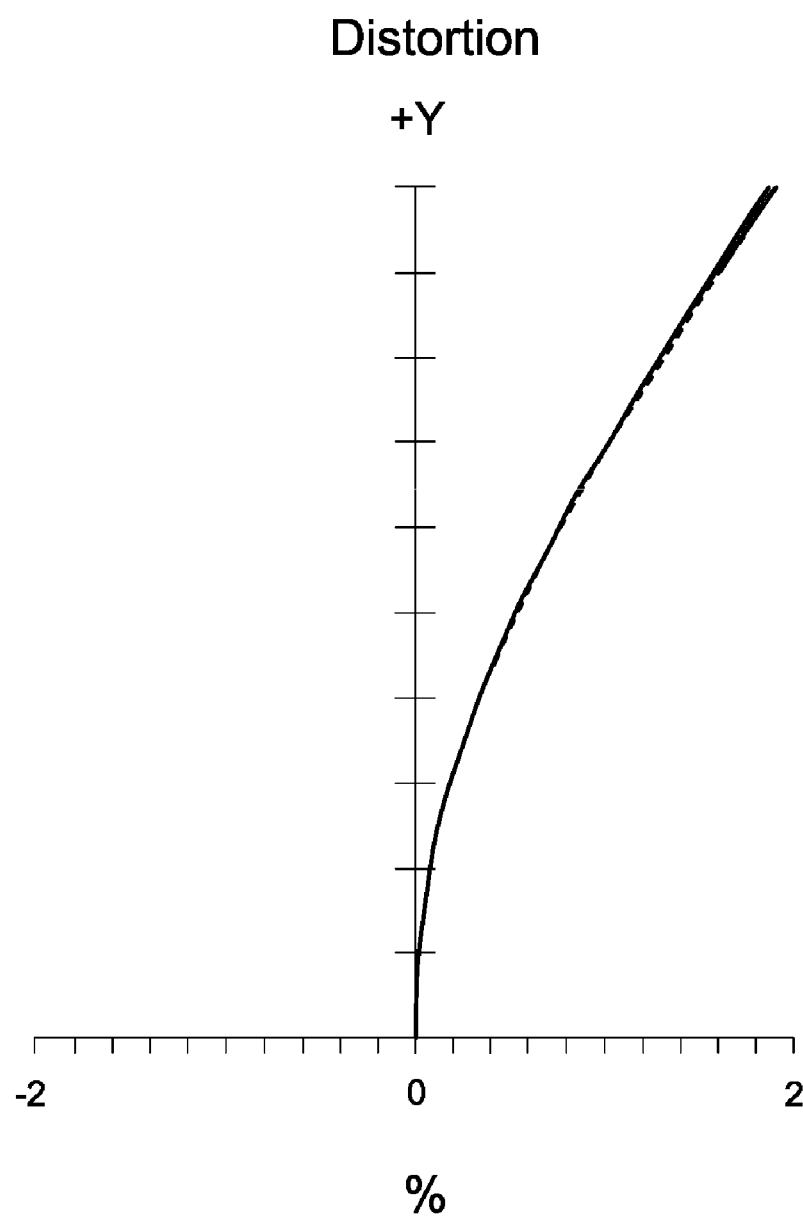
FIG. 4B is a distortion diagram of the lens assembly in accordance with the second embodiment of the invention.
Figure 4C:
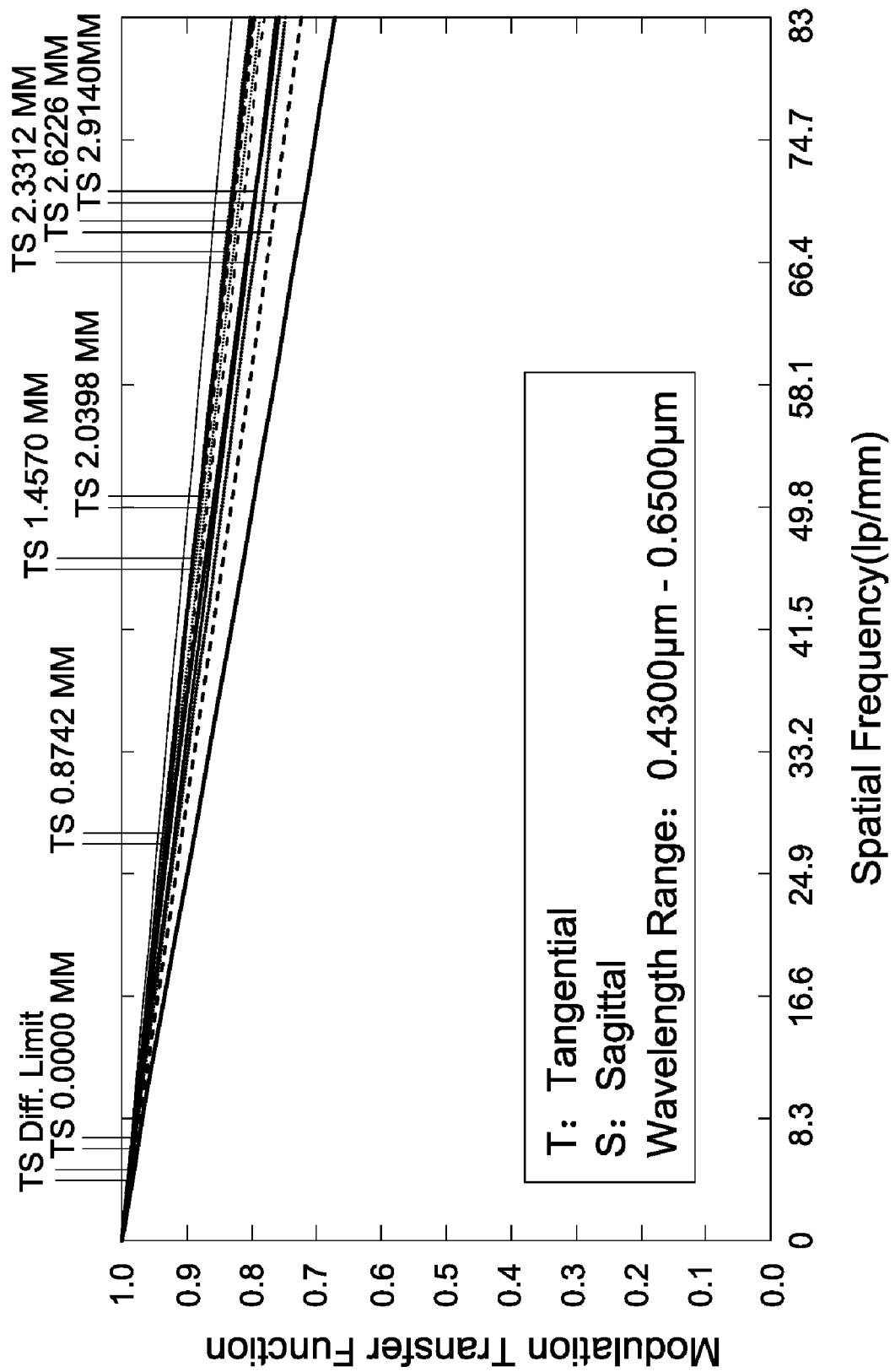
FIG. 4C is a modulation transfer function diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a field curvature diagram of the lens assembly 2 in accordance with the second embodiment of the invention, FIG. 4B shows a distortion diagram of the lens assembly 2 in accordance with the second embodiment of the invention, and FIG. 4C shows a modulation transfer function diagram of the lens assembly 2 in accordance with the second embodiment of the invention.

It can be seen from FIG. 4A that the field curvature of tangential direction and sagittal direction in the lens assembly 2 of the second embodiment ranges from −0.03 mm to 0.08 mm for the wavelength of 0.430 μm, 0.470 μm, 0.510 μm, 0.555 μm, 0.610 μm, and 0.650 μm.

It can be seen from FIG. 4B (in which the six lines in the figure almost coincide to appear as if a signal line) that the distortion in the lens assembly 2 of the second embodiment ranges from 0% to 2% for the wavelength of 0.430 μm, 0.470 μm, 0.510 μm, 0.555 μm, 0.610 μm, and 0.650 μm.

It can be seen from FIG. 4C that the modulation transfer function of tangential direction and sagittal direction in the lens assembly 2 of the second embodiment ranges from 0.67 to 1.0 wherein the wavelength ranges from 0.4300 μm to 0.6500 μm, the fields respectively are 0.0000 mm, 0.8742 mm, 1.4570 mm, 2.0398 mm, 2.3312 mm, 2.6226 mm, and 2.9140 mm, and the spatial frequency ranges from 0 lp/mm to 83 lp/mm.

It is obvious that the field curvature and the distortion of the lens assembly 2 of the second embodiment can be corrected effectively, and the resolution of the lens assembly 2 of the second embodiment can meet the requirement. Therefore, the lens assembly 2 of the second embodiment is capable of good optical performance.

Figure 5:
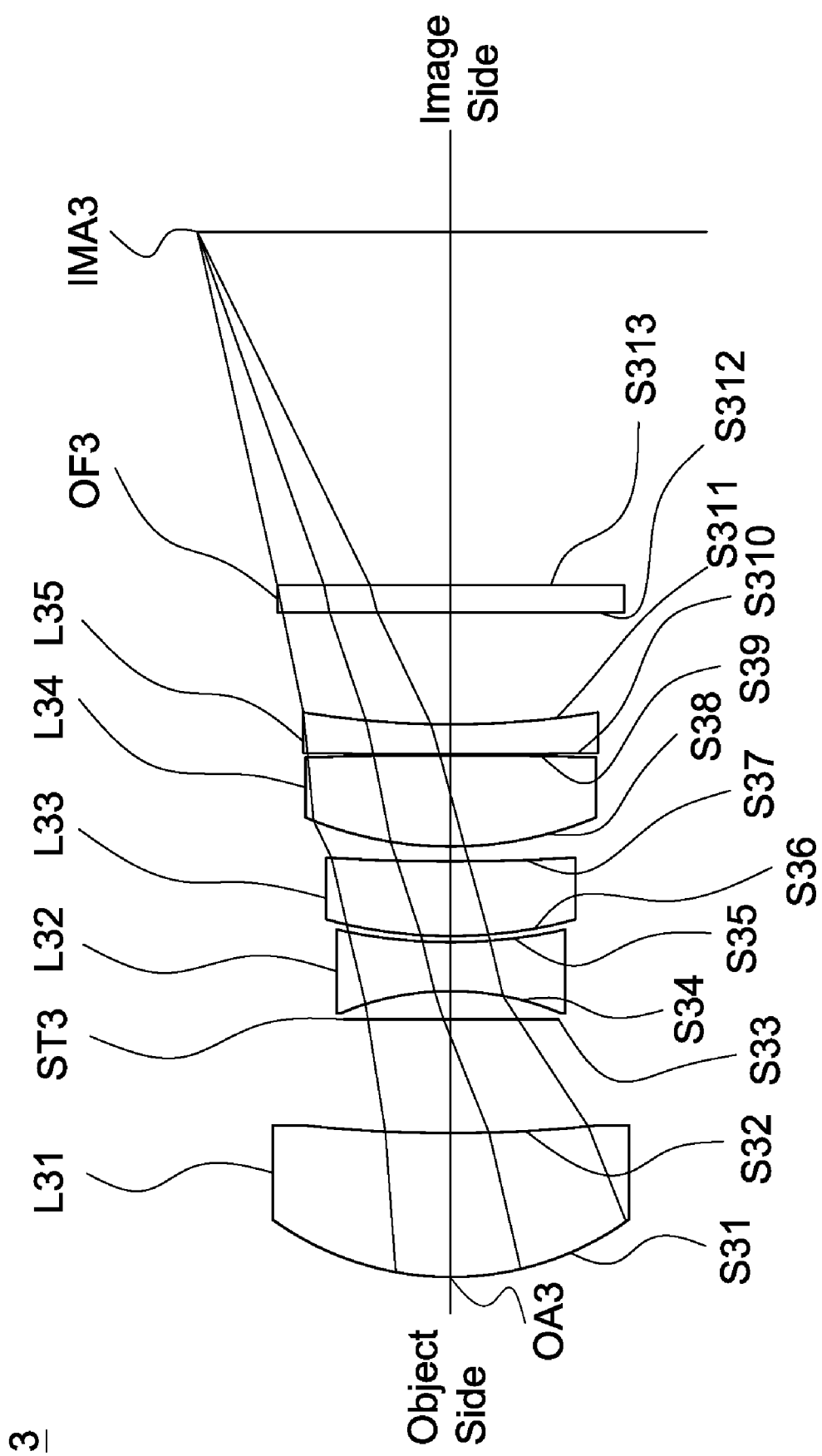
FIG. 5 is a lens layout and optical path diagram of a lens assembly in accordance with a third embodiment of the invention.

Referring to FIG. 5, FIG. 5 is a lens layout diagram of a lens assembly in accordance with a third embodiment of the invention. The lens assembly 3 includes a first lens L31, a stop ST3, a second lens L32, a third lens L33, a fourth lens L34, a fifth lens L35 and an optical filter OF3, all of which are arranged in order from an object side to an image side along an optical axis OA3. In operation, an image of light rays from the object side is formed at the image plane IMA3. According to the second paragraphs to the ninth paragraphs of the DETAILED DESCRIPTION OF THE INVENTION, wherein:

The first lens L31 is further a meniscus lens and the image side surface S32 is a concave surface. The second lens L32 is further a biconcave lens, wherein the object side surface S34 is a concave surface, the image side surface S35 is a concave surface. The third lens L33 is further a biconvex lens and the image side surface S37 is a convex surface. The fourth lens L34 is further a biconvex lens, wherein the object side surface S38 is a convex surface, the image side surface S39 is a convex surface. The fifth lens L35 is further a biconcave lens and the object side surface S310 is a concave surface.

Both of the object side surface S312 and image side surface S313 of the optical filter OF3 are plane surfaces.

By the above design of the lenses and stop ST3, and satisfies at least one of the conditions (1)-(10), the lens assembly 3 is provided with an effective shortened total lens length, an increased resolution, and an effective corrected aberration.

In order to achieve the above purposes and effectively enhance the optical performance, the lens assembly 3 in accordance with the third embodiment of the invention is provided with the optical specifications shown in Table 7, which include the effective focal length, F-number, total lens length, field of view, radius of curvature of each lens surface, thickness between adjacent surface, refractive index of each lens and Abbe number of each lens. Table 7 shows that the effective focal length is equal to 11.410 mm, F-number is equal to 2.89, total lens length is equal to 11.838 mm, and field of view is equal to 28.6 degrees for the lens assembly 3 of the third embodiment of the invention.

TABLE 7

Effective Focal Length = 11.410 mm
F-number = 2.89
Total Lens Length = 11.838 mm
Field of View = 28.6 degrees

| Surface Number | Radius of Curvature (mm) | Thickness (mm) | Nd | Vd | Remark |
|---|---|---|---|---|---|
| S31 | 3.618996 | 1.62788 | 1.6855 | 54.62 | The First Lens L31 |
| S32 | 11.78382 | 1.306667 | | | |
| S33 | ∞ | 0.2941134 | | | Stop ST3 |
| S34 | −3.0136 | 0.56795 | 1.6606 | 20.401 | The Second Lens L32 |
| S35 | 5.289578 | 0.0682902 | | | |
| S36 | 4.618101 | 0.864562 | 1.5352 | 56.115 | The Third Lens L33 |
| S37 | −29.4656 | 0.1560438 | | | |
| S38 | 3.8225 | 1.031818 | 1.6606 | 20.401 | The Fourth Lens L34 |
| S39 | −19.9784 | 0.017 | | | |
| S310 | −26.4462 | 0.316 | 1.5352 | 56.115 | The Fifth Lens L35 |
| S311 | 6.748697 | 1.268432 | | | |
| S312 | ∞ | 0.3 | 1.5168 | 64.167 | Optical Filter OF3 |
| S313 | ∞ | 4.01944 | | | |

The definition of the aspheric surface sag z of each lens in Table 7 is the same as the definition of the aspheric surface sag z of each lens in Table 1 in the first embodiment, and is not described here again.

In the third embodiment, the conic constant k and the aspheric coefficients A, B, C, D, E, F and G of each surface are shown in Table 8.

TABLE 8

| Surface Number | k | A E | B F | C G | D |
|---|---|---|---|---|---|
| S31 | 0.122376 | −0.00041428105 −6.6851147e−007 | −5.5077937e−005 −3.0357476e−007 | −2.05314e−005 3.3997586e−008 | 2.6515721e−006 |
| S32 | 0 | −0.00065029741 3.7645468e−006 | −0.00019260841 4.5122499e−007 | −8.2348916e−005 −2.9642344e−007 | −1.9673604e−005 |
| S34 | 0 | 0.022252792 5.6096002e−005 | −0.0025068657 2.0642511e−005 | −0.0010498072 −2.5020563e−005 | 0.00026444153 |
| S35 | −0.777656 | −0.003471937 0.00049475943 | −0.0043042723 8.543793e−005 | 0.00026428833 −0.00016676557 | 0.00034549966 |
| S36 | −1.05979 | −0.0041792391 0.00055029844 | −0.0075923081 −2.7702623e−005 | 0.0014998992 −0.00015940668 | 0.0011870175 |
| S37 | −111.241 | −0.0040871235 0.0002857162 | 0.0050928973 6.7575802e−005 | 0.001597314 −5.9366447e−005 | −0.00029646699 |
| S38 | −7.850553 | −0.0091241913 −9.5271327e−005 | 0.003499046 −1.9337427e−005 | 0.00099383712 7.4322569e−006 | 4.7281476e−005 |
| S39 | −106.4059 | −0.009874585 −6.7217299e−005 | 0.0028519996 −1.9295083e−006 | 0.00096052055 −4.0780598e−007 | 0.00020943111 |
| S310 | −154.9735 | −0.013198914 0.00011441745 | 0.0034089983 1.7408621e−005 | 0.00067056551 −1.1340441e−005 | −7.4512954e−005 |
| S311 | −5.985144 | −0.0093831933 2.0579448e−005 | 0.00080930222 −1.4402307e−005 | −0.00078072751 1.7761997e−006 | 0.00032502867 |

Table 9 shows the parameters and condition values for conditions (1)-(10). As can be seen from Table 9, the lens assembly 3 of the third embodiment satisfies the conditions (1)-(10).

TABLE 9

| f | 11.410 mm | $f_1$ | 7.048 mm | $f_2$ | −2.829 mm |
|---|---|---|---|---|---|
| $f_3$ | 7.526 mm | $f_4$ | 4.942 mm | $f_5$ | −10.012 mm |
| $f_{45}$ | 13.197 mm | $R_{11}$ | 3.619 mm | $R_{12}$ | 11.784 mm |
| $R_{21}$ | −3.014 mm | $R_{22}$ | 5.290 mm | $R_{31}$ | 4.618 mm |
| $R_{32}$ | −29.466 mm | $R_{41}$ | 3.823 mm | $R_{42}$ | −19.978 mm |
| TTL | 11.838 mm | BFL | 5.588 mm | | |
| $(R_{11} + R_{12})/(R_{21} + R_{22})$ | 6.768 | $f_3 + f_4$ | 12.468 mm | $f/f_5$ | 0−1.140 |
| $(R_{31} + R_{32})/(R_{41} + R_{42})$ | 1.538 | $f_5/f_1$ | −1.421 | BFL/TTL | 0.472 |
| $R_{21}/R_{22}$ | −0.570 | $R_{41}/R_{11}$ | 1.056 | $f/f_2$ | −4.033 |

Figure 6A:
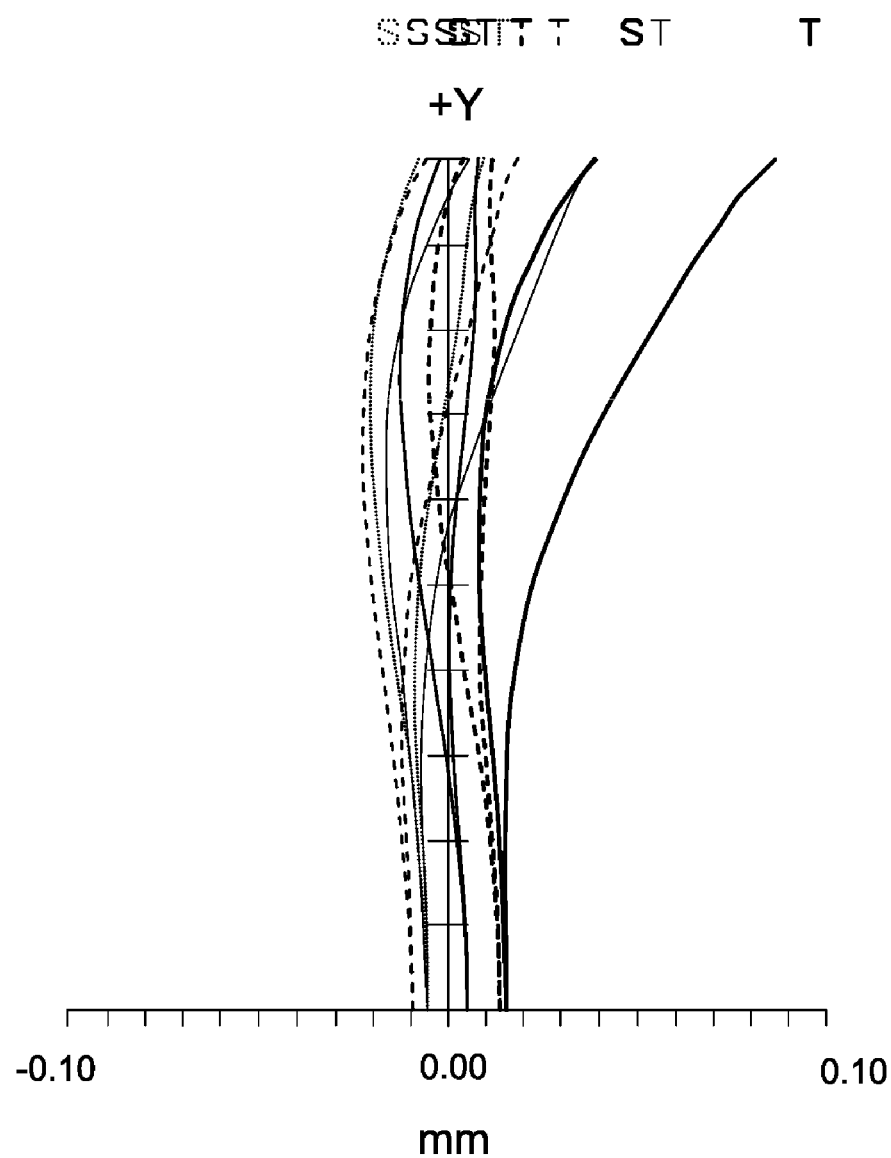
FIG. 6A depicts a field curvature diagram of the lens assembly in accordance with the third embodiment of the invention.
Figure 6B:
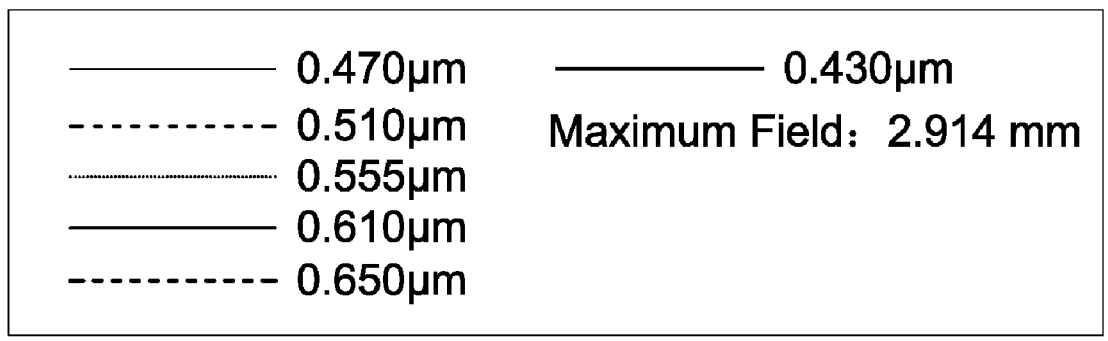
FIG. 6B is a distortion diagram of the lens assembly in accordance with the third embodiment of the invention.
Figure 6B:
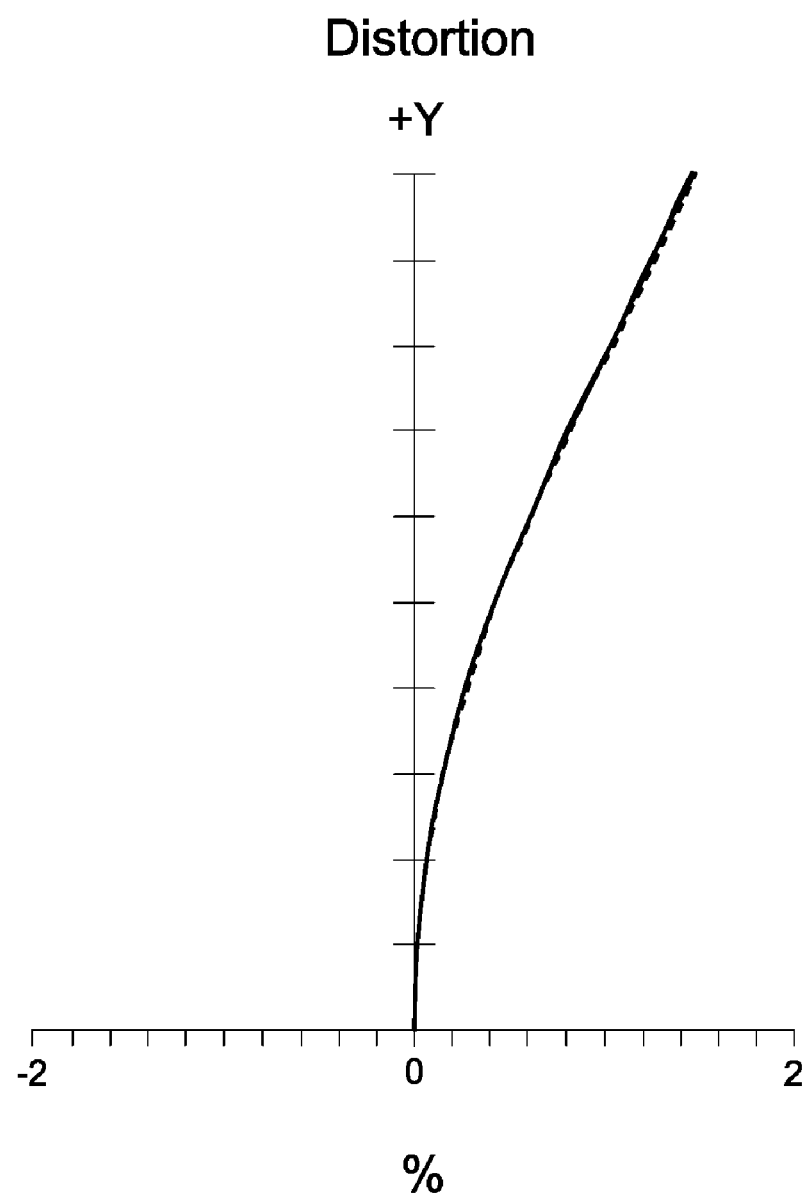
Figure 6C:
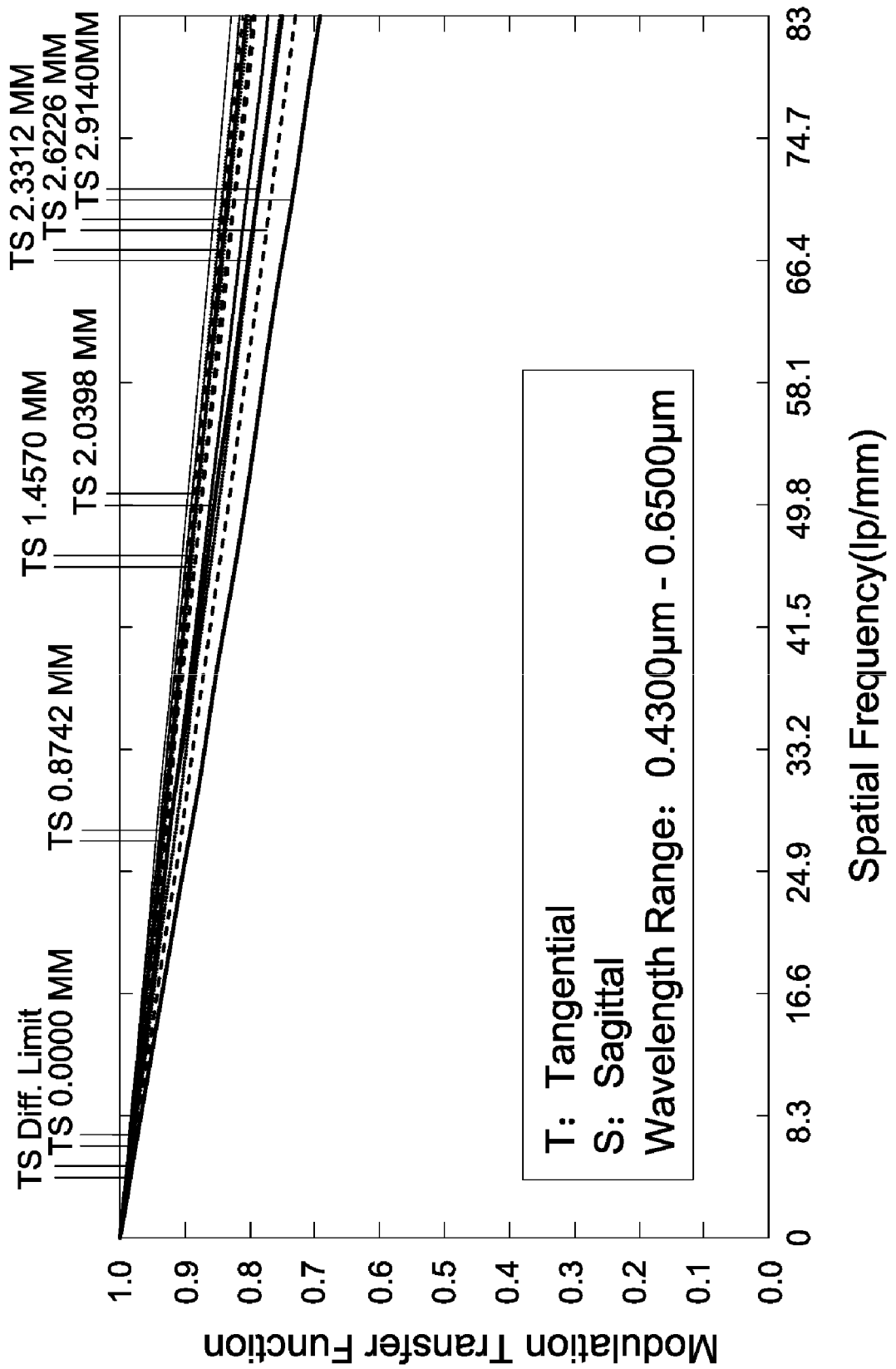
FIG. 6C is a modulation transfer function diagram of the lens assembly in accordance with the third embodiment of the invention.

By the above arrangements of the lenses and stop ST3, the lens assembly 3 of the third embodiment can meet the requirements of optical performance as seen in FIGS. 6A-6C, wherein FIG. 6A shows a field curvature diagram of the lens assembly 3 in accordance with the third embodiment of the invention, FIG. 6B shows a distortion diagram of the lens assembly 3 in accordance with the third embodiment of the invention, and FIG. 6C shows a modulation transfer function diagram of the lens assembly 3 in accordance with the third embodiment of the invention.

It can be seen from FIG. 6A that the field curvature of tangential direction and sagittal direction in the lens assembly 3 of the third embodiment ranges from −0.03 mm to 0.09 mm for the wavelength of 0.430 μm, 0.470 μm, 0.510 μm, 0.555 μm, 0.610 μm, and 0.650 μm.

It can be seen from FIG. 6B (in which the six lines in the figure almost coincide to appear as if a signal line) that the distortion in the lens assembly 3 of the third embodiment ranges from 0% to 1.5% for the wavelength of 0.430 μm, 0.470 μm, 0.510 μm, 0.555 μm, 0.610 μm, and 0.650 μm.

It can be seen from FIG. 6C that the modulation transfer function of tangential direction and sagittal direction in the lens assembly 3 of the third embodiment ranges from 0.69 to 1.0 wherein the wavelength ranges from 0.4300 μm to 0.6500 μm, the fields respectively are 0.0000 mm, 0.8742 mm, 1.4570 mm, 2.0398 mm, 2.3312 mm, 2.6226 mm, and 2.9140 mm, and the spatial frequency ranges from 0 lp/mm to 83 lp/mm.

It is obvious that the field curvature and the distortion of the lens assembly 3 of the third embodiment can be corrected effectively, and the resolution of the lens assembly 3 of the third embodiment can meet the requirement. Therefore, the lens assembly 3 of the third embodiment is capable of good optical performance.

Figure 7:
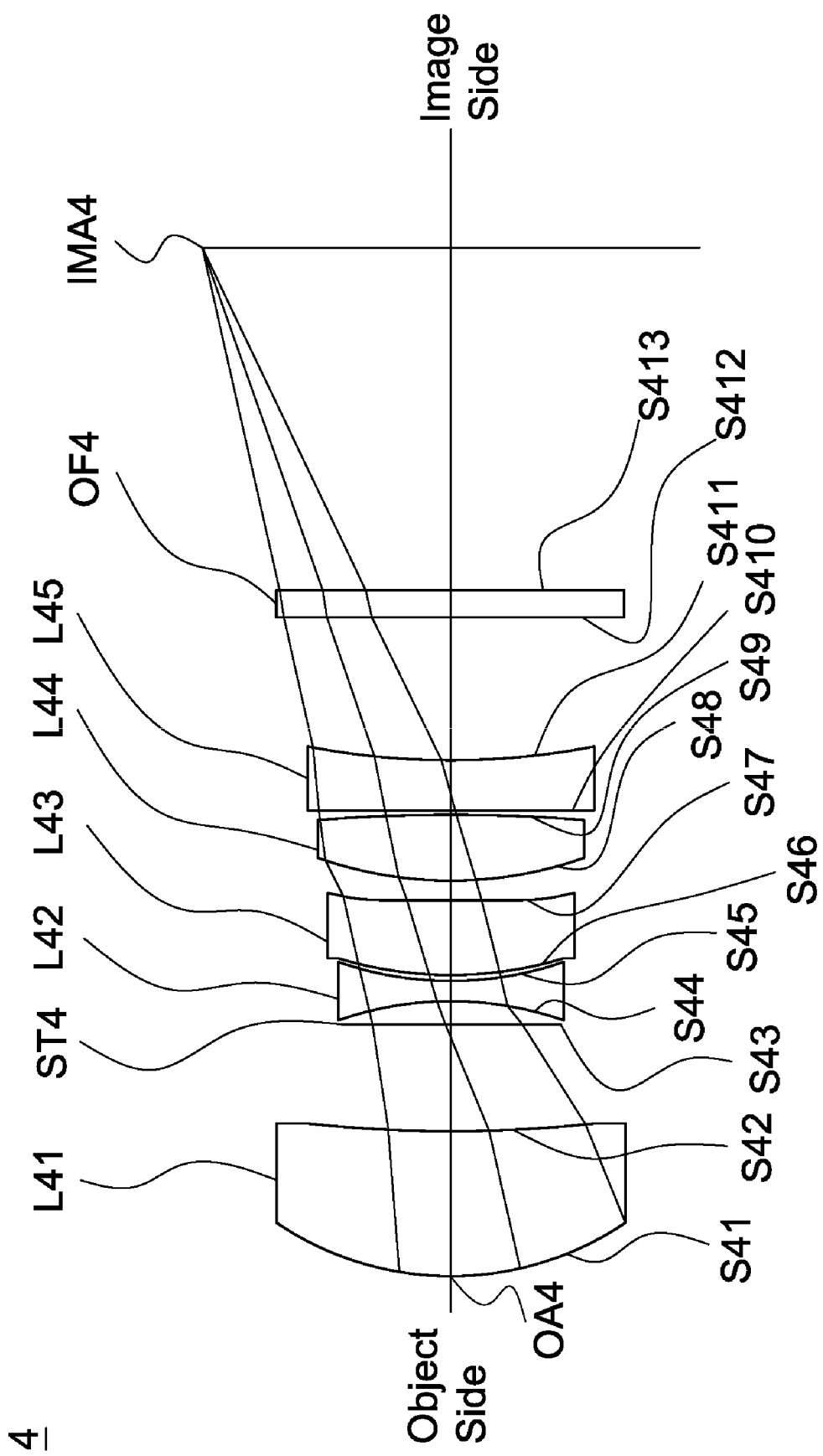
FIG. 7 is a lens layout and optical path diagram of a lens assembly in accordance with a fourth embodiment of the invention.

Referring to FIG. 7, FIG. 7 is a lens layout diagram of a lens assembly in accordance with a fourth embodiment of the invention. The lens assembly 4 includes a first lens L41, a stop ST4, a second lens L42, a third lens L43, a fourth lens L44, a fifth lens L45 and an optical filter OF4, all of which are arranged in order from an object side to an image side along an optical axis OA4. In operation, an image of light rays from the object side is formed at the image plane IMA4. According to the second paragraphs to the ninth paragraphs of the DETAILED DESCRIPTION OF THE INVENTION, wherein:

The first lens L41 is further a meniscus lens and the image side surface S42 is a concave surface. The second lens L42 is further a biconcave lens, wherein the object side surface S44 is a concave surface, the image side surface S45 is a concave surface. The third lens L43 is further a meniscus lens and the image side surface S47 is a concave surface. The fourth lens L44 is further a biconvex lens, wherein the object side surface S48 is a convex surface, the image side surface S49 is a convex surface. The fifth lens L45 is further a meniscus lens and the object side surface S410 is a convex surface.

Both of the object side surface S412 and image side surface S413 of the optical filter OF4 are plane surfaces.

By the above design of the lenses and stop ST4, and satisfies at least one of the conditions (1)-(10), the lens assembly 4 is provided with an effective shortened total lens length, an increased resolution, and an effective corrected aberration.

In order to achieve the above purposes and effectively enhance the optical performance, the lens assembly 4 in accordance with the fourth embodiment of the invention is provided with the optical specifications shown in Table 10, which include the effective focal length, F-number, total lens length, field of view, radius of curvature of each lens surface, thickness between adjacent surface, refractive index of each lens and Abbe number of each lens. Table 10 shows that the effective focal length is equal to 11.704 mm, F-number is equal to 2.91, total lens length is equal to 12.006 mm, and field of view is equal to 27.9 degrees for the lens assembly 4 of the fourth embodiment of the invention.

TABLE 10

Effective Focal Length = 11.704 mm
F-number = 2.91
Total Lens Length = 12.006 mm
Field of View = 27.9 degrees

| Surface Number | Radius of Curvature (mm) | Thickness (mm) | Nd | Vd | Remark |
|---|---|---|---|---|---|
| S41 | 3.651707 | 1.684264 | 1.6855 | 54.62 | The First Lens L41 |
| S42 | 11.96909 | 1.262051 | | | |
| S43 | ∞ | 0.2941134 | | | Stop ST4 |
| S44 | −3.04478 | 0.2412432 | 1.6606 | 20.401 | The Second Lens L42 |
| S45 | 4.498398 | 0.0616809 | | | |
| S46 | 4.206133 | 0.8431848 | 1.5352 | 56.115 | The Third Lens L43 |
| S47 | 31.74468 | 0.2372711 | | | |
| S48 | 4.022028 | 0.7630183 | 1.6606 | 20.401 | The Fourth Lens L44 |
| S49 | −12.6784 | 0.05 | | | |
| S410 | 45 | 0.6089424 | 1.5352 | 56.115 | The Fifth Lens L45 |
| S411 | 6.748697 | 1.644738 | | | |
| S412 | ∞ | 0.3 | 1.5168 | 64.167 | Optical Filter OF4 |
| S413 | ∞ | 4.015623 | | | |

The definition of the aspheric surface sag z of each lens in Table 10 is the same as the definition of the aspheric surface sag z of each lens in Table 1 in the first embodiment, and is not described here again.

In the fourth embodiment, the conic constant k and the aspheric coefficients A, B, C, D, E, F and G of each surface are shown in Table 11.

TABLE 11

| Surface Number | k | A<br>E | B<br>F | C<br>G | D |
|---|---|---|---|---|---|
| S41 | 0.122902 | −0.00045227638<br>−2.971189e−007 | −3.0662275e−005<br>−2.1772687e−007 | −2.4063373e−005<br>1.8608025e−008 | 2.9182094e−006 |
| S42 | 0 | −0.00082840913<br>4.5041938e−008 | −0.00020536143<br>−6.5250078e−007 | −2.2760869e−005<br>1.9054076e−007 | −1.4526843e−005 |
| S44 | 0 | 0.023355374<br>9.8409793e−005 | −0.002056996<br>9.3470182e−005 | −0.00089859546<br>−6.1404865e−005 | 0.00016832051 |
| S45 | −0.750868 | −0.0035878881<br>0.0005073077 | −0.0050610013<br>4.3775344e−005 | 0.00040051237<br>−0.00016425988 | 0.00062094611 |
| S46 | −1.412348 | −0.0046843649<br>0.00055924866 | −0.007644912<br>−2.088331e−006 | 0.0012476669<br>−0.00017145385 | 0.00096754873 |
| S47 | −640.2764 | −0.0033270015<br>0.00012593624 | 0.0057146748<br>6.7873406e−006 | 0.0015521014<br>−2.3559655e−005 | −0.00048539778 |
| S48 | −8.610373 | −0.010007311<br>−7.7397905e−005 | 0.003577795<br>−3.213847e−006 | 0.0010519068<br>2.3717302e−006 | 4.0503343e−005 |
| S49 | −115.8914 | −0.011147009<br>−3.1586157e−005 | 0.0024308179<br>1.4155225e−007 | 0.00082828542<br>−2.0030251e−006 | 0.00027822172 |
| S410 | 524.8459 | −0.014401884<br>8.94376e−005 | 0.0029712553<br>2.0602767e−005 | 0.00065573743<br>−1.1130143e−005 | −0.00015179667 |
| S411 | −16.67555 | −0.0079376658<br>1.6391591e−005 | 0.0015788106<br>−1.9101025e−005 | −0.00082048219<br>2.471605e−006 | 0.00029290054 |

Table 12 shows the parameters and condition values for conditions (1)-(10). As can be seen from Table 12, the lens assembly 4 of the fourth embodiment satisfies the conditions (1)-(10).

TABLE 12

| f | 11.704 mm | $f_1$ | 7.083 mm | $f_2$ | −2.714 mm |
|---|---|---|---|---|---|
| $f_3$ | 8.963 mm | $f_4$ | 4.708 mm | $f_5$ | −14.917 mm |
| $f_{45}$ | 13.673 mm | $R_{11}$ | 3.652 mm | $R_{12}$ | 11.969 mm |

TABLE 12-continued

| $R_{21}$ | −3.045 mm | $R_{22}$ | 4.498 mm | $R_{31}$ | 4.206 mm |
|---|---|---|---|---|---|
| $R_{32}$ | 31.745 mm | $R_{41}$ | 4.022 mm | $R_{42}$ | −12.678 mm |
| TTL | 12.006 mm | BFL | 5.960 mm | | |
| $(R_{11} + R_{12})/(R_{21} + R_{22})$ | 10.746 | $f_3 + f_4$ | 13.671 mm | $f/f_5$ | −0.785 |
| $(R_{31} + R_{32})/(R_{41} + R_{42})$ | −4.153 | $f_5/f_1$ | −2.106 | BFL/TTL | 0.496 |
| $R_{21}/R_{22}$ | −0.677 | $R_{41}/R_{11}$ | 1.101 | $f/f_2$ | −4.312 |

Figure 8A:
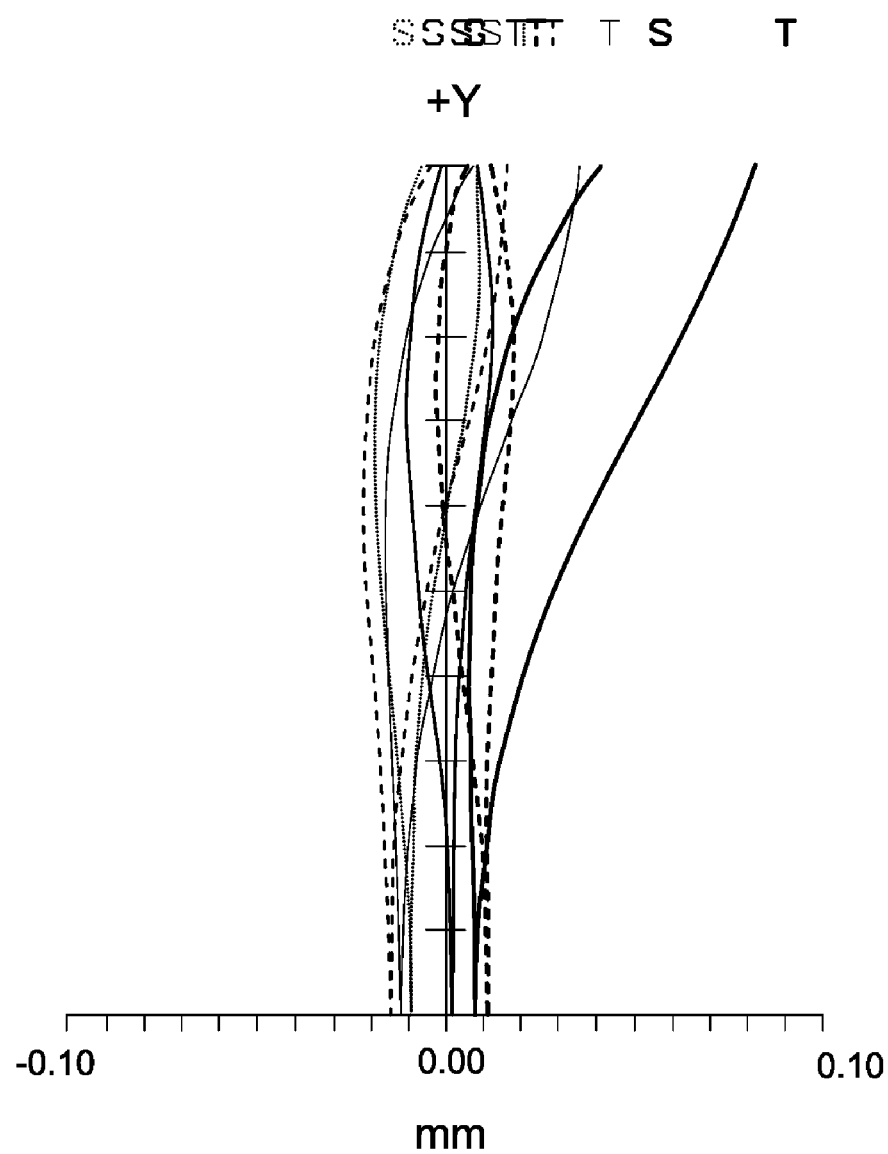
FIG. 8A depicts a field curvature diagram of the lens assembly in accordance with the fourth embodiment of the invention.
Figure 8B:
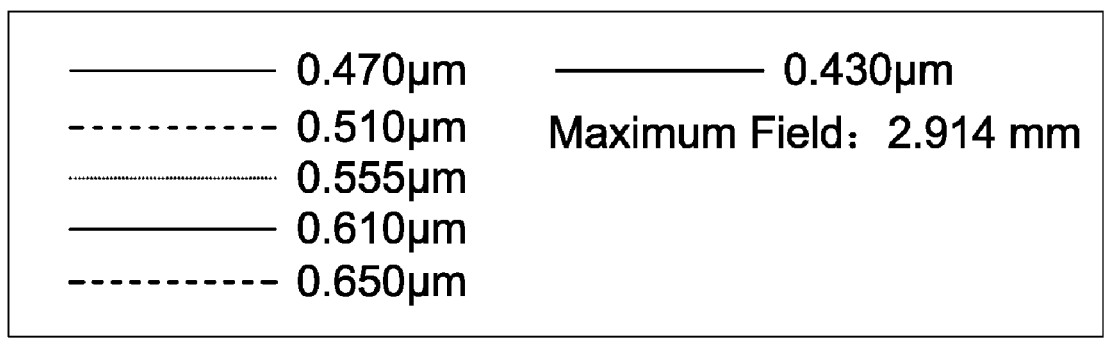
FIG. 8B is a distortion diagram of the lens assembly in accordance with the fourth embodiment of the invention.
Figure 8B:
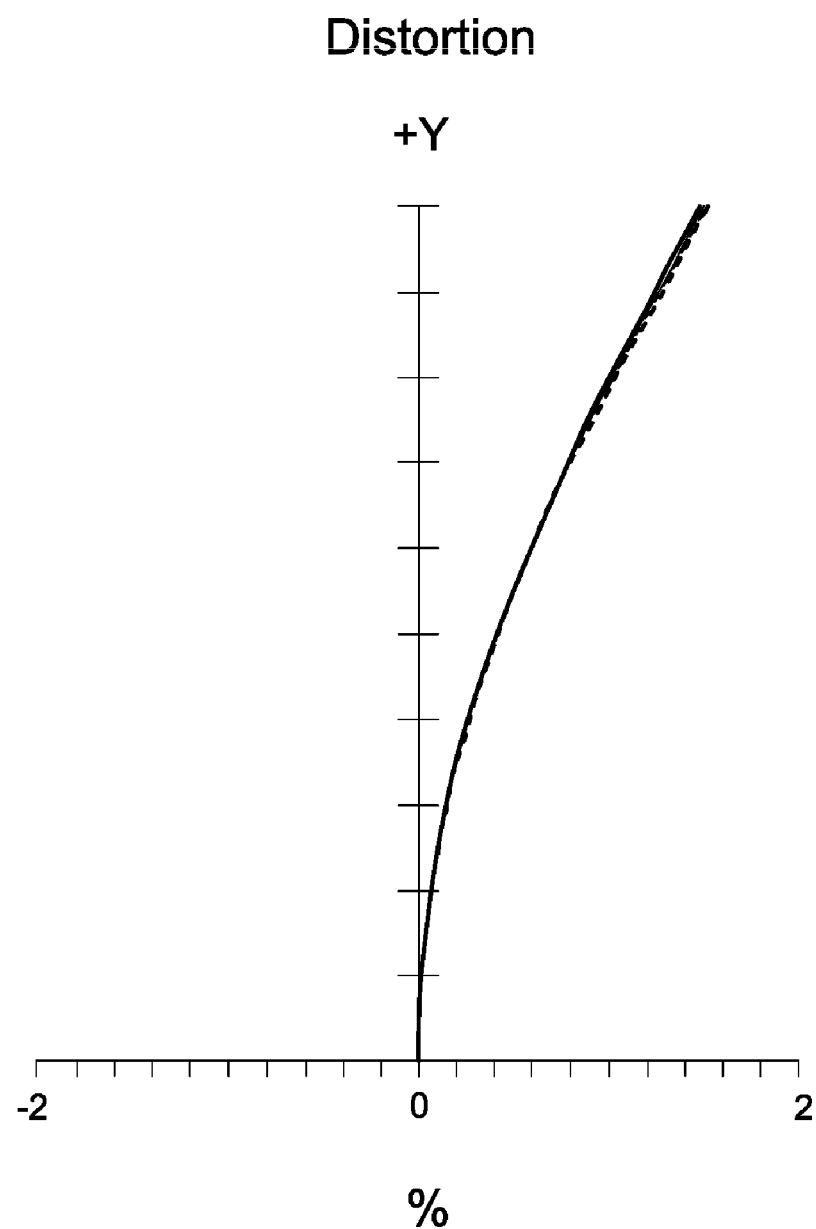
Figure 8C:
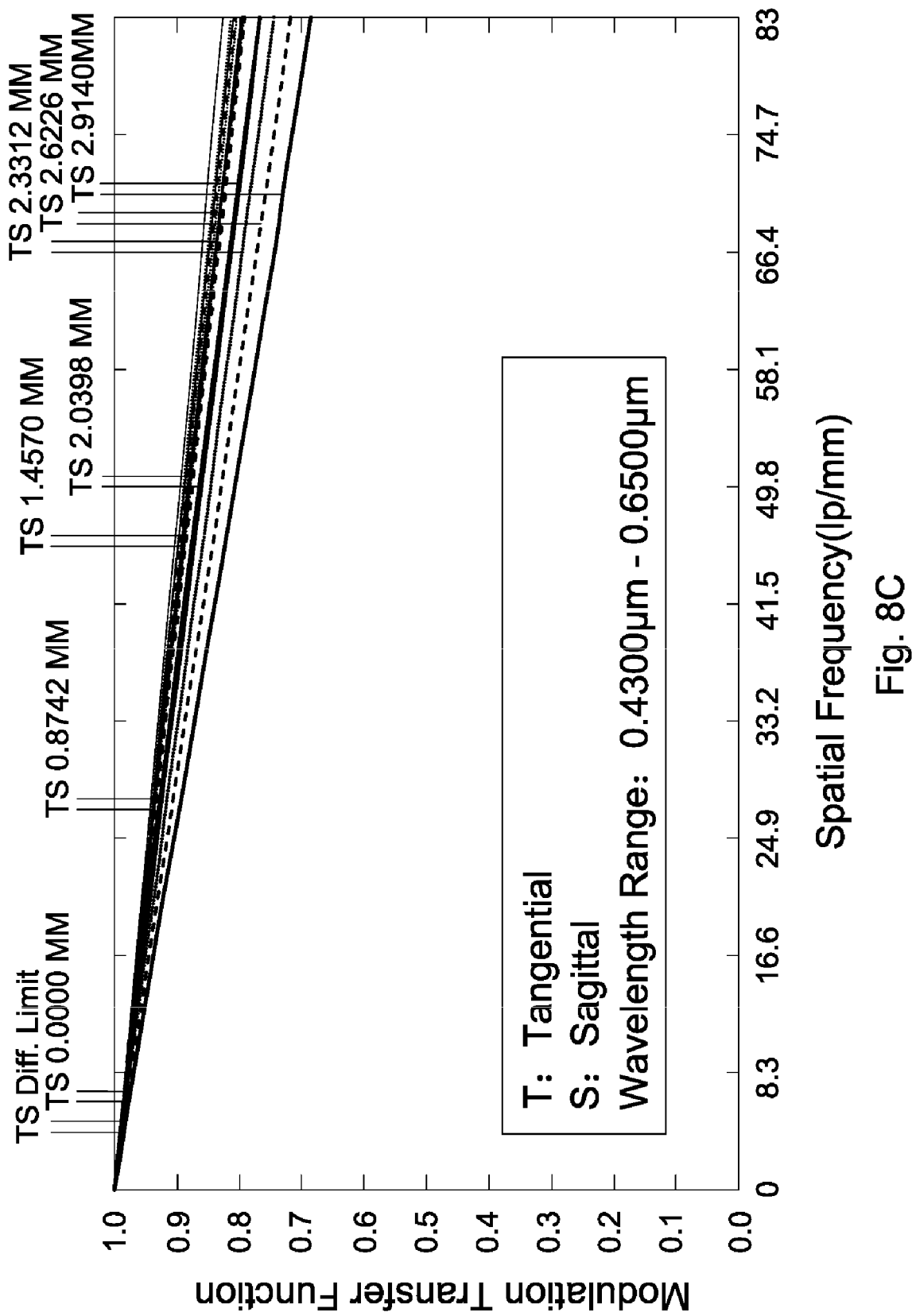
FIG. 8C is a modulation transfer function diagram of the lens assembly in accordance with the fourth embodiment of the invention.

By the above arrangements of the lenses and stop ST4, the lens assembly 4 of the fourth embodiment can meet the requirements of optical performance as seen in FIGS. 8A-8C, wherein FIG. 8A shows a field curvature diagram of the lens assembly 4 in accordance with the fourth embodiment of the invention, FIG. 8B shows a distortion diagram of the lens assembly 4 in accordance with the fourth embodiment of the invention, and FIG. 8C shows a modulation transfer function diagram of the lens assembly 4 in accordance with the fourth embodiment of the invention.

It can be seen from FIG. 8A that the field curvature of tangential direction and sagittal direction in the lens assembly 4 of the fourth embodiment ranges from −0.03 mm to 0.09 mm for the wavelength of 0.430 μm, 0.470 μm, 0.510 μm, 0.555 μm, 0.610 μm, and 0.650 μm.

It can be seen from FIG. 8B (in which the six lines in the figure almost coincide to appear as if a signal line) that the distortion in the lens assembly 4 of the fourth embodiment ranges from 0% to 1.6% for the wavelength of 0.430 μm, 0.470 μm, 0.510 μm, 0.555 μm, 0.610 μm, and 0.650 μm.

It can be seen from FIG. 8C that the modulation transfer function of tangential direction and sagittal direction in the lens assembly 4 of the fourth embodiment ranges from 0.68 to 1.0 wherein the wavelength ranges from 0.4300 μm to 0.6500 μm, the fields respectively are 0.0000 mm, 0.8742 mm, 1.4570 mm, 2.0398 mm, 2.3312 mm, 2.6226 mm, and 2.9140 mm, and the spatial frequency ranges from 0 lp/mm to 83 lp/mm.

It is obvious that the field curvature and the distortion of the lens assembly 4 of the fourth embodiment can be corrected effectively, and the resolution of the lens assembly 4 of the fourth embodiment can meet the requirement. Therefore, the lens assembly 4 of the fourth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly, comprising sequentially from an object side to an image side along an optical axis:
   a first lens with positive refractive power and comprising a convex surface facing the object side and a concave surface facing the image side;
   a second lens with negative refractive power;
   a third lens with positive refractive power and comprising a convex surface facing the object side;
   a fourth lens with positive refractive power;
   a fifth lens with negative refractive power and comprising a concave surface facing the image side;
   wherein the lens assembly satisfies:

$-5 < f/f_2 < -3$, wherein f is an effective focal length of the lens assembly and $f_2$ is an effective focal length of the second lens.

2. The lens assembly as claimed in claim 1, wherein the lens assembly satisfies:

$-2 < f/f_5 < 0$, $-2.5 < f_5/f_1 < 0$, wherein f is an effective focal length of the lens assembly, $f_1$ is an effective focal length of the first lens, and $f_5$ is an effective focal length of the fifth lens.

3. The lens assembly as claimed in claim 1, wherein the lens assembly satisfies:

$0.4 < BFL/TTL < 0.55$, wherein BFL is an interval from the concave surface of the fifth lens to an image plane along the optical axis and TTL is an interval from the convex surface of the first lens to the image plane along the optical axis.

4. The lens assembly as claimed in claim 1, wherein the lens assembly satisfies:

$10 \text{ mm} < f_3 + f_4 < 15 \text{ mm}$, wherein $f_3$ is an effective focal length of the third lens and $f_4$ is an effective focal length of the fourth lens.

5. The lens assembly as claimed in claim 4, wherein the lens assembly satisfies:

$0 < R_{41}/R_{11} < 2$, wherein $R_{11}$ is a radius of curvature of the convex surface of the first lens and $R_{41}$ is a radius of curvature of the object side surface of the fourth lens.

6. The lens assembly as claimed in claim 1, wherein the lens assembly satisfies:

$5 < (R_{11}+R_{12})/(R_{21}+R_{22}) < 15$, wherein $R_{11}$ is a radius of curvature of the convex surface of the first lens, $R_{12}$ is a radius of curvature of the concave surface of the first lens, $R_{21}$ is a radius of curvature of the object surface of the second lens, and $R_{22}$ is a radius of curvature of the image side surface of the second lens.

7. The lens assembly as claimed in claim 6, wherein the lens assembly satisfies:

$10 \text{ mm} < f_{45} < 15 \text{ mm}$, wherein $f_{45}$ is an effective focal length of a combination of the fourth lens and the fifth lens.

8. The lens assembly as claimed in claim 1, wherein the first lens is a meniscus lens, the second lens is a biconcave lens which comprises a concave surface facing the object side and another concave surface facing the image side, and the fourth lens is a biconvex lens which comprises a convex surface facing the object side and another convex surface facing the image side.

9. The lens assembly as claimed in claim 8, wherein the lens assembly satisfies:

$-5 < (R_{31}+R_{32})/(R_{41}+R_{42}) < 2$, wherein $R_{31}$ is a radius of curvature of the convex surface of the third lens, $R_{32}$ is a radius of curvature of the image side surface of the third lens, $R_{41}$ is a radius of curvature of the convex surface of the fourth lens, and $R_{42}$ is a radius of curvature of the another convex surface of the fourth lens.

10. The lens assembly as claimed in claim 9, wherein the fifth lens is a biconcave lens and further comprises a concave surface facing the object side.

11. A lens assembly, comprising sequentially from an object side to an image side along an optical axis:
    a first lens with positive refractive power including a convex surface facing the object side;
    a second lens with negative refractive power;
    a third lens with positive refractive power including a convex surface facing the object side and a convex surface facing the image side;
    a fourth lens with positive refractive power;
    a fifth lens with negative refractive power including a concave surface facing the image side;
    wherein the lens assembly satisfies:

$-1 < R_{21}/R_{22} < -0.5$, wherein $R_{21}$ is a radius of curvature of the object side surface of the second lens and $R_{22}$ is a radius of curvature of the image side surface of the second lens.

12. The lens assembly as claimed in claim 11, wherein the lens assembly satisfies:

$-2 < f/f_5 < 0$, $10 \text{ mm} < f_3 + f_4 < 15 \text{ mm}$, wherein f is an effective focal length of the lens assembly, $f_3$ is an effective focal length of the third lens, $f_4$ is an effective focal length of the fourth lens and $f_5$ is an effective focal length of the fifth lens.

13. The lens assembly as claimed in claim 12, wherein the lens assembly satisfies:

$-2.5 < f_5/f_1 < 0$, wherein $f_1$ is an effective focal length of the first lens and $f_5$ is an effective focal length of the fifth lens.

14. The lens assembly as claimed in claim 11, wherein the lens assembly satisfies:

$0.4 < BFL/TTL < 0.55$, wherein BFL is an interval from the concave surface of the fifth lens to an image plane along the optical axis and TTL is an interval from the convex surface of the first lens to the image plane along the optical axis.

15. The lens assembly as claimed in claim 11, wherein the lens assembly satisfies:

$$5 < (R_{11}+R_{12})/(R_{21}+R_{22}) < 15,$$

wherein $R_{11}$ is a radius of curvature of the convex surface of the first lens, $R_{12}$ is a radius of curvature of the image side surface of the first lens, $R_{21}$ is a radius of curvature of the object surface of the second lens, and $R_{22}$ is a radius of curvature of the image side surface of the second lens.

16. The lens assembly as claimed in claim 15, wherein the lens assembly satisfies:

$$0 < R_{41}/R_{11} < 2,$$

wherein $R_{11}$ is a radius of curvature of the convex surface of the first lens and $R_{41}$ is a radius of curvature of the object side surface of the fourth lens.

17. The lens assembly as claimed in claim 13 wherein the lens assembly satisfies:

$$-5 < f/f_2 < -3,$$

wherein f is an effective focal length of the lens assembly and $f_2$ is an effective focal length of the second lens.

18. The lens assembly as claimed in claim 11, wherein the lens assembly satisfies:

$$10 \text{ mm} \leq f_{45} < 15 \text{ mm},$$

wherein $f_{45}$ is an effective focal length of a combination of the fourth lens and the fifth lens.

19. The lens assembly as claimed in claim 11, wherein the first lens is a meniscus lens and further comprises a concave surface facing the image side, the second lens is a biconcave lens and comprises a concave surface facing the object side and another concave surface facing the image side, and the fourth lens is a biconvex lens and comprises a convex surface facing the object side and another convex surface facing the image side.

20. The lens assembly as claimed in claim 19, wherein the lens assembly satisfies:

$$-5 < (R_{31}+R_{32}/R_{41}+R_{42}) < 2,$$

wherein $R_{31}$ is a radius of curvature of the convex surface of the third lens, $R_{32}$ is a radius of curvature of the image side surface of the third lens, $R_{41}$ is a radius of curvature of the convex surface of the fourth lens, and $R_{42}$ is a radius of curvature of the another convex surface of the fourth lens.

* * * * *